(12) United States Patent
Gallagher et al.

(10) Patent No.: US 7,116,075 B2
(45) Date of Patent: Oct. 3, 2006

(54) ELECTRIC POWER STEERING SYSTEM FOR A VEHICLE

(75) Inventors: Thomas James Gallagher, Lake Orion, MI (US); Hong Jiang, Lake Orion, MI (US); Sergei Kolomeitsev, Rochester, MI (US); John R. Suriano, Auburn Hills, MI (US); Joseph P. Whinnery, Pontiac, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 346 days.

(21) Appl. No.: 10/698,567

(22) Filed: Oct. 31, 2003

(65) Prior Publication Data

US 2005/0093493 A1    May 5, 2005

(51) Int. Cl.
*H02P 1/46*    (2006.01)
(52) U.S. Cl. .............. 318/700; 318/811; 318/139
(58) Field of Classification Search ........... 318/700, 318/727, 138, 139, 254, 599, 811
See application file for complete search history.

(56) References Cited

U.S. PATENT DOCUMENTS

| | | | |
|---|---|---|---|
| 3,560,818 A | 2/1971 | Amato | |
| 4,655,099 A | 4/1987 | Hansen | |
| 4,956,590 A * | 9/1990 | Phillips | 318/432 |
| 5,159,542 A * | 10/1992 | Miller et al. | 363/41 |
| 5,206,571 A | 4/1993 | Burri | |
| 5,294,876 A * | 3/1994 | Jonsson | 318/803 |
| 5,321,342 A | 6/1994 | Kruse | |
| 5,598,078 A * | 1/1997 | Maeda | 318/696 |
| 5,729,113 A * | 3/1998 | Jansen et al. | 318/799 |
| 5,757,596 A | 5/1998 | Weber et al. | |
| 5,767,642 A * | 6/1998 | Furukawa | 318/286 |
| 5,855,195 A | 1/1999 | Oikawa et al. | |
| 5,998,929 A | 12/1999 | Bechtel et al. | |
| 6,196,078 B1 | 3/2001 | DeJonge et al. | |
| 6,266,591 B1 | 7/2001 | Wilson-Jones et al. | |
| 6,320,731 B1 | 11/2001 | Eaves et al. | |
| 6,326,750 B1 | 12/2001 | Marcinkiewicz | |
| 6,359,401 B1 | 3/2002 | Garcia-Sinclair et al. | |
| 6,465,973 B1 | 10/2002 | Kato et al. | |
| 6,670,782 B1 * | 12/2003 | Kuwano et al. | 318/685 |
| 6,747,433 B1 * | 6/2004 | Kuwano et al. | 318/685 |
| 6,850,027 B1 * | 2/2005 | Kuwano et al. | 318/685 |
| 2001/0019210 A1 | 9/2001 | Fukasaku et al. | |
| 2003/0057803 A1 | 3/2003 | Desbiolles et al. | |
| 2003/0057908 A1 | 3/2003 | Kusaka et al. | |
| 2005/0263330 A1 * | 12/2005 | Gallagher et al. | 180/65.1 |

* cited by examiner

*Primary Examiner*—Karen Masih
(74) *Attorney, Agent, or Firm*—Jacox Meckstroth & Jenkins

(57) ABSTRACT

A control system for an electric motor. Field Oriented Control, FOC, uses a digital control system, and attempts to maintain the rotating stator magnetic field ninety degrees ahead of the rotor field, in order to maximize torque. However, if a three-phase motor is used, which is very common, large amounts of computation are required, to convert from a three-phase coordinate system to an orthogonal coordinate system. The invention replaces the three-phase motor with a two-phase motor, which has been found to impose certain additional costs, but also provides benefits.

34 Claims, 23 Drawing Sheets

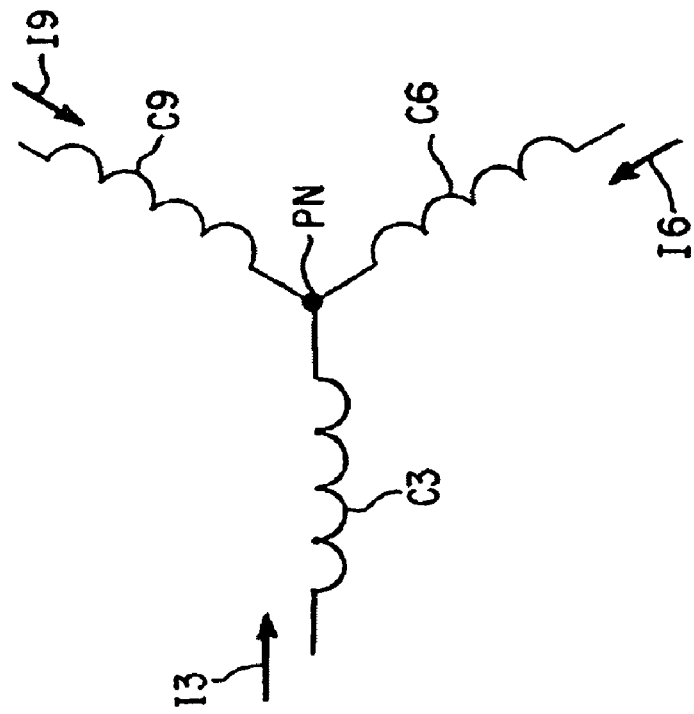
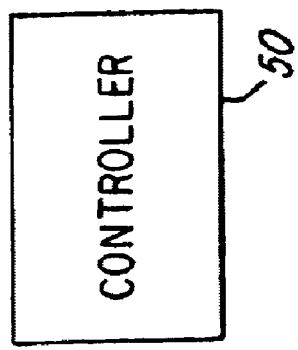
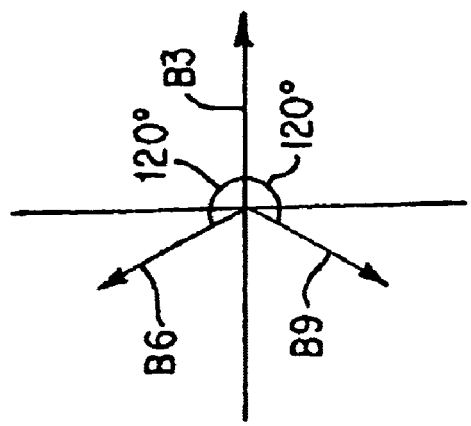
FIG-8 (PRIOR ART)

$|V_L| = |V_{ab}| = |V_{bc}| = |V_{ca}| = \sqrt{3}|V_p|$

TOTAL POWER $= \sqrt{3}|V_{LINE}||I_p|$

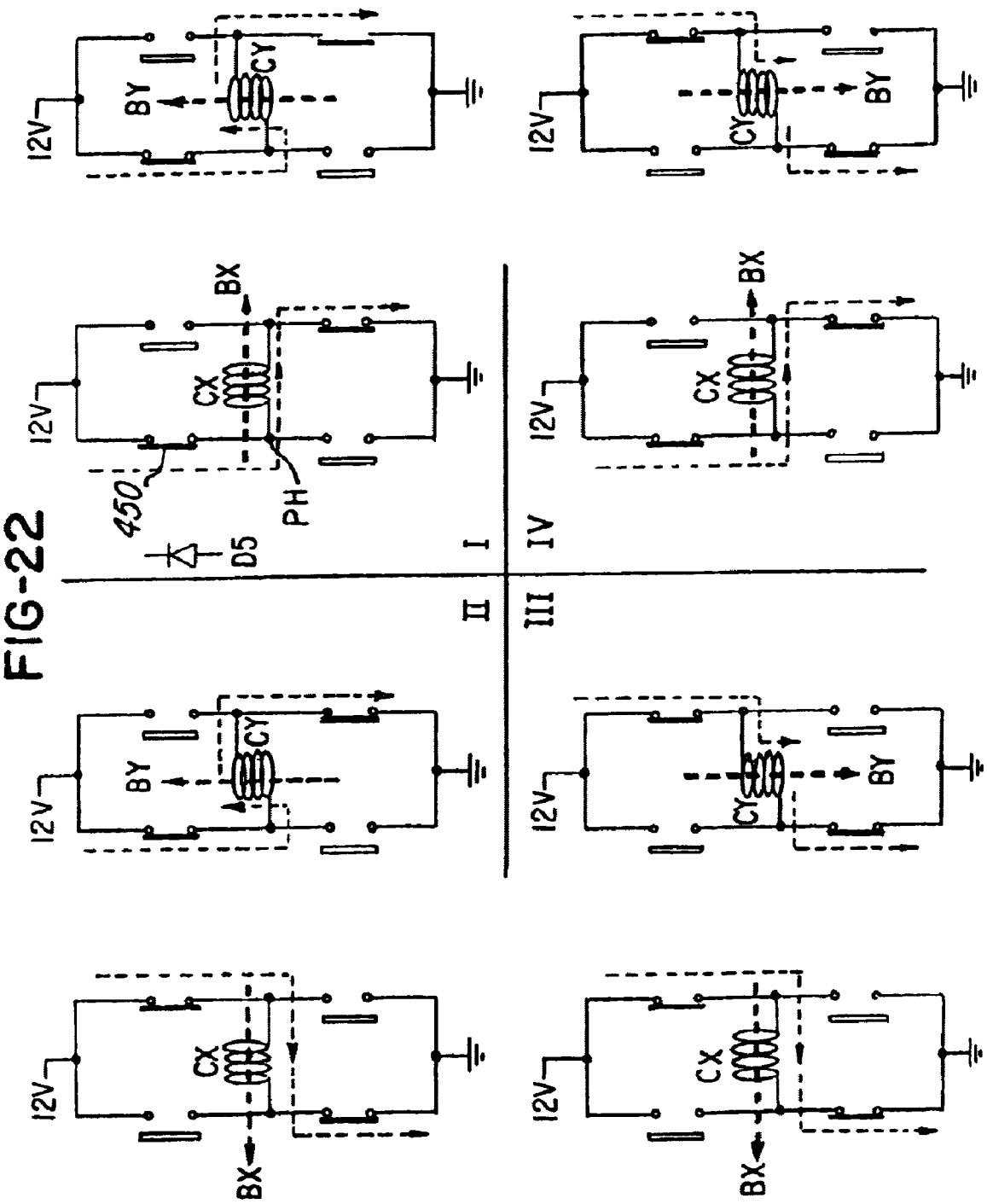

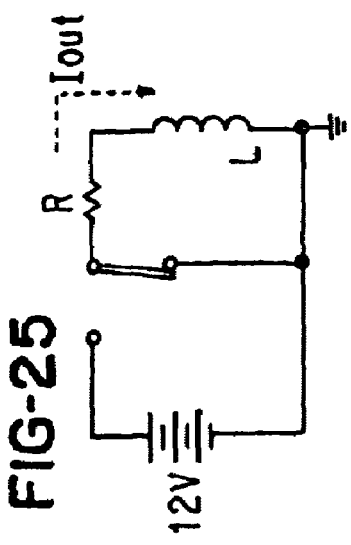
FIG-23 FIG-24 FIG-25
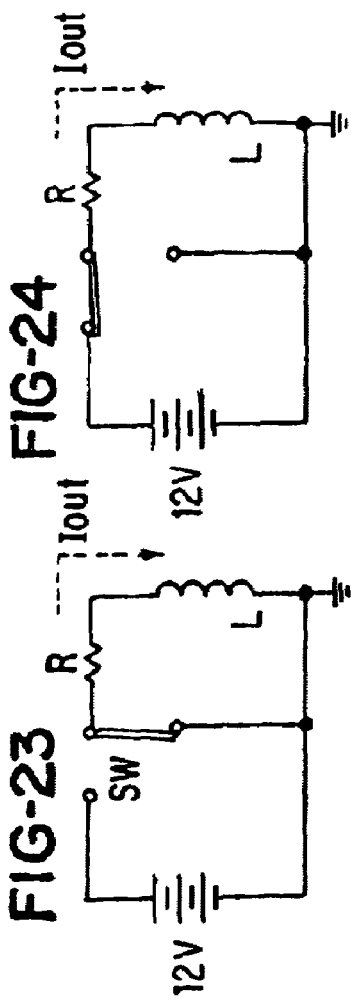
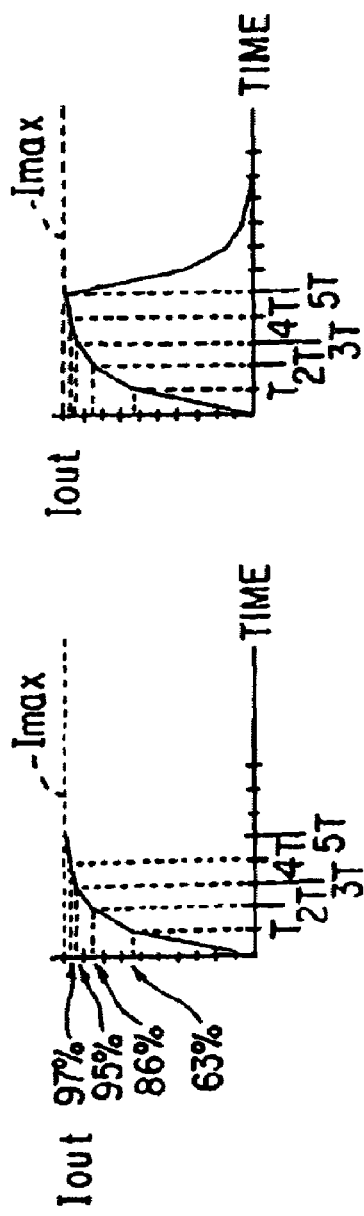
FIG-26

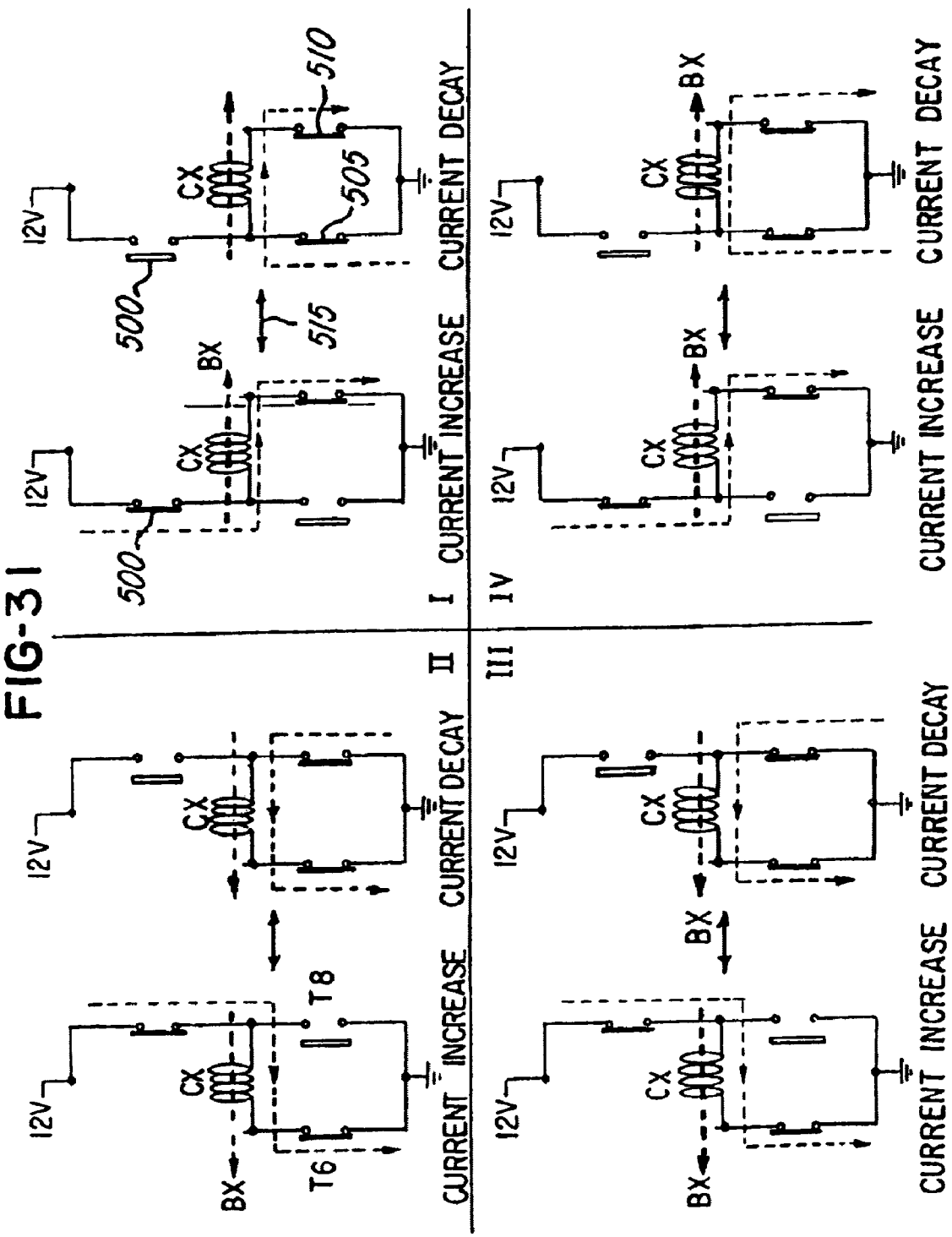

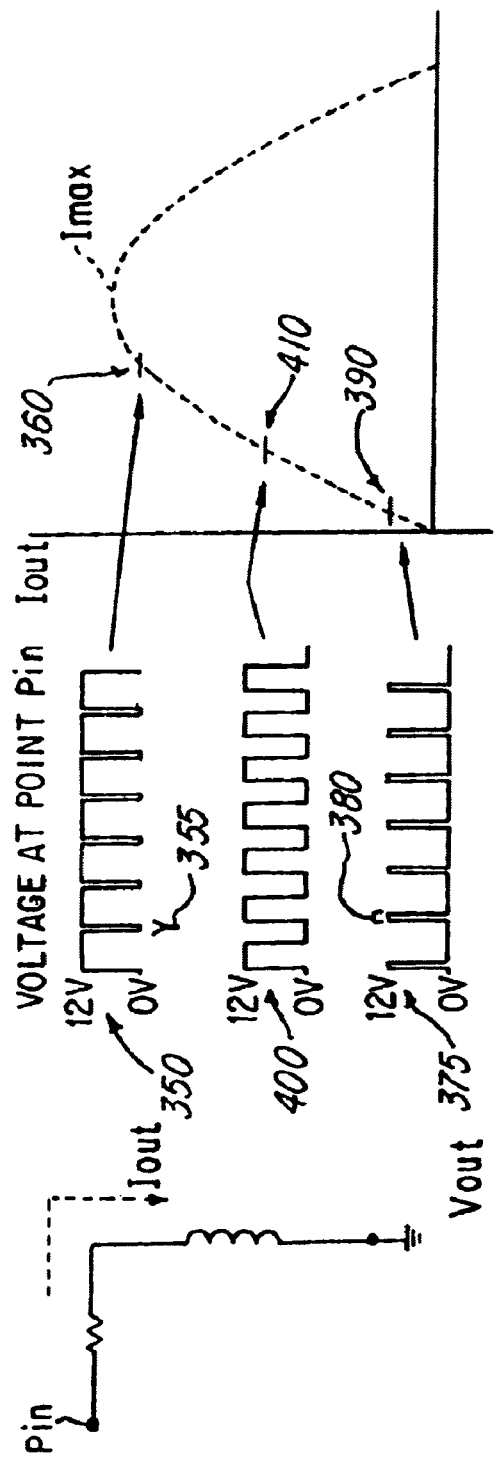
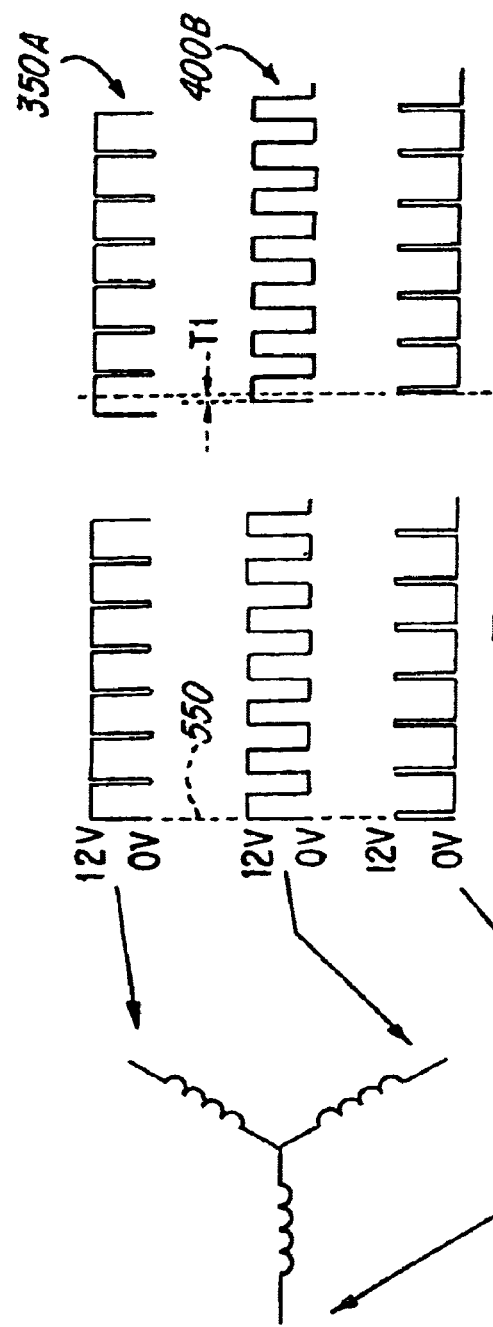
FIG-32
FIG-33

FIG-35

| MOTOR TYPE | | PHASES | COMMUTATION | | CONTROL |
|---|---|---|---|---|---|
| BRUSH DC MOTOR | PERMANENT MAGNET | 3 SLOTS | MECHANICAL | | OPEN LOOP |
| | SERIES WOUND FIELD | 4 SLOTS | | | VOLTAGE |
| | SHUNT WOUND FIELD | N slots | | | CURRENT |
| | COMPOUND WOUND FIELD | | | | FIELD CONTROL |
| SWITCHED RELUCTANCE MOTOR | | 1 | CURRENT REGULATED | | OPEN LOOP |
| | | 2 | VOLTAGE REGULATED | | VOLTAGE |
| | | 3 | | | CURRENT |
| | | 4 | | | PHASE ANGLE |
| | | n | | | |
| INDUCTION MOTOR | | 1 | SINUSOIDAL SPACE VECTOR | | OPEN LOOP |
| | | 2 | TRIANGLE – SINE | | CONSTANT V/HZ |
| | | 3 | | | FOC |
| | | n | | | |
| PIEZOELECTRIC MOTOR | | | | | |
| BRUSHLESS DC | | 2 | SINE | | FOC |

INVENTION

# ELECTRIC POWER STEERING SYSTEM FOR A VEHICLE

This application is related to an application entitled "FAULT-HANDLING SYSTEM FOR ELECTRIC POWER-STEERING SYSTEM," which is concurrently filed herewith on Oct. 31, 2003, and which is hereby incorporated by reference.

The invention relates to electric power-steering systems in vehicles, and simplified control systems used therein.

BACKGROUND OF THE INVENTION

This discussion will first explain how a simple synchronous motor operates, and then explain one type of prior-art speed control used with such a motor.

Synchronous Motor

FIG. 1 illustrates schematically three stator coils 3, 6, and 9, which are contained in a three-phase synchronous motor (not shown). FIG. 2 shows the coils, but with connecting wires W of FIG. 1 omitted, to avoid clutter. In FIG. 2, currents I3, I6, and I9 are generated in the respective coils. Each current produces a magnetic field B3, B6, and B9, as indicated.

The coils 3, 6, and 9 are physically positioned to be 120 degrees apart, as shown, so that the fields B3, B6, and B9 are also positioned 120 spatial degrees apart. This arrangement allows creation of a magnetic field which rotates in space at a constant speed, if proper currents are generated in the coils, as will now be explained.

FIG. 3 illustrates three-phase currents. The vertical axis on the coordinates runs from negative unity to positive unity for simplicity. In practice, one would multiply the values of unity by the actual peak-to-peak values of the currents being used.

Currents in the form of sine waves SIN3, SIN6, and SIN9 are created respectively in coils 3, 6, and 9, as indicated. Coil 3 resides at zero physical degrees. SIN3 begins at zero electrical degrees, as indicated on the plot.

Similarly, coil 6 stands at 120 degrees from coil 3. SIN6 begins at 120 degrees, as indicated on the plot. Similarly, coil 9 stands at 240 degrees from coil 3. Correspondingly, SIN9 begins at 240 degrees, as indicated on the plot.

Each coil 3, 6, and 9 produces a magnetic field, as indicated. Those three magnetic fields add vectorially to produce a single magnetic field. Two examples will illustrate this vectorial addition.

In the first example, time T1 is chosen in FIG. 3, which corresponds to 255 electrical degrees. T1 is also indicated in FIG. 4. At this time T1, the values of the currents I3, I6, and I9 are indicated. Those currents exist in coils 3, 6, and 9 in FIGS. 2 and 3. Those currents produce magnetic fields which are roughly proportional to the currents.

Since the coils 3, 6, and 9 are physically positioned at angles of zero, 120, and 240 degrees, the magnetic fields are also positioned at those angles. The magnetic fields are indicated as B3, B6, and B9 in FIG. 4.

It is noted that field B3 is positioned at 180 degrees, rather than zero degrees. This occurs because current I3 is negative, thus producing a magnetic field B3 which is 180 degrees from the magnetic field which would be produced by a positive current.

Field-vectors B3, B6, and B9 are re-positioned within circle C1, to show vector addition. They sum to the resultant vector R1. Resultant R1 represents the vector sum of the three magnetic fields, and is an actual magnetic field vector located in space. Resultant R1 is the magnetic field produced by the three coils, and is termed the stator field.

In the second example, time T2 in FIG. 3 is chosen, which corresponds to 330 electrical degrees. T2 is also indicated in FIG. 5. At this time T2, the particular values of currents I3, I6, and I9 are indicated.

It is noted that I3 and I6 are superimposed over each other: the same arrow represents both. It should be observed that these two identical currents produce two magnetic fields of the same size at this time. However, because the two currents I3 and I6 are applied to coils which are physically 120 degrees apart, the magnetic fields are oriented differently in space.

The magnetic field vectors produced are indicated as B3, B6, and B9 in FIG. 5.

It is noted that fields B3 and B6 are positioned at 180 and 300 degrees, respectively, rather than at zero and 120 degrees. As before, this occurs because currents I3 and I6 are negative, producing magnetic fields B3 and B6 which are 180 degrees rotated from the magnetic field which would be produced by positive voltages.

Field-vectors B3, B6, and B9 are re-positioned within circle C2, to show vector addition. They sum to the resultant vector R2. Resultant R2 represents the vector sum of the three magnetic fields, and is an actual magnetic field vector located in space. It is the stator field.

If these two examples are repeated for every angle from zero to 360 in FIG. 3, it will be found that a resultant R in FIG. 6 is produced at each angle, and that all resultants R are identical in length. It will also be found that, as one computes resultant R for sequential angles, that resultant R rotates at a uniform speed around circle C.

The arrangement just described produces a constant magnetic field which rotates at a constant speed. This rotating field can be used as shown in FIG. 7.

FIG. 7 illustrates the coils of FIG. 2. A rotor ROT is added, which contains a rotor magnetic field RF, produced by a magnetic field source FS, which may be a permanent magnet or electrical coil. Because of the laws of physics, the rotor field RF will attempt to follow the rotating resultant R. Consequently, the rotating resultant R induces rotation in the rotor ROT, producing motor-action.

Control System

A prior-art approach to controlling speed of the motor just described will be given. In one approach, the basic idea is to maintain the resultant stator field R in FIG. 7 at 90 degrees ahead of the rotor field RF. (FIG. 7 shows the resultant R at zero degrees with respect to RF.)

The particular approach to be explained is sometimes termed "Field Oriented Control," FOC. In FOC, the stator field is transformed, or superimposed, onto a rotating coordinate system, and is then compared with the rotor field, within the rotating coordinate system. Under this approach, two fields (stator and rotor) are, ideally, not changing with respect to each other and, when they do change, they change slowly, with respect to each other. FOC reduces bandwidth requirements, especially in Proportional Integral controllers, used to control the error between the two fields.

Perhaps an analogy can explain the bandwidth reduction. Assume two race horses traveling on a circular track. Each, in essence, can be represented by a hand on a clock. In one approach, a stationary observer can, say, every second, compute position of each horse, compare the positions, and deduce a difference between positions. In essence, the observer computes an angle for each hand of the clock, and continually compares those changing angles. However, even if the horses are running nose-to-nose, the observer still must compute an angle for each horse every second, and each angle changes, second-to-second.

In the FOC approach, the observer, in essence, rides along with the horses. If the horses are nose-to-nose, the observer computes a steady zero difference. When one horse passes the other, the observer computes a slowly changing difference.

The FOC approach reduces the number of a certain type of computation which must be done, thereby reducing bandwidth requirements.

In explaining FOC, a current in a coil will sometimes be treated interchangeably with the magnetic field which the coil produces. One reason is that the two parameters are approximately proportional to each other, unless the coil is saturated. Thus, a current and the field it produces differ only by a constant of proportionality.

FIG. 8 is a schematic of the connection of the three coils C3, C6, and C9 in one type of synchronous motor (not shown). They are connected in a WYE configuration, with point PN representing neutral.

A significant feature of the WYE configuration is that the currents in the coils are not mutually independent. Instead, by virtue of Kirchoffs Current Law, the three currents must sum to zero at point PN. Thus, only two independent currents are present, because once they are specified, the third is thereby determined. One significance of this feature will be explained later, in connection with the present invention.

A CONTROLLER 50 measures and controls the currents I3, I6, and I9, in a manner to be described. It is again emphasized that each current I3, I6, and I9 produces a respective magnetic field B3, B6, and B9 which are separated in space by 120 degrees, as indicated. (B3, B6, and B9 in FIG. 8 only show the different directions in space, but not different magnitudes.)

The CONTROLLER 50 undertakes the processes which will be explained with reference to FIGS. 9–14. Block 55 in FIG. 9 indicates that the CONTROLLER 50 in FIG. 8, or an associated device, measures each current I3, I6, and I9. In block 57 in FIG. 9, a data point, or vector, for each current is computed, giving the magnitude and direction of the magnetic field produced by each current. For example, if the measurement occurred at time T1 in FIG. 4, then vectors B3, B6, and B9 would be computed. Those vectors are shown adjacent block 57 in FIG. 9.

In block 60, two orthogonal vectors are computed which produce the equivalent magnetic field to the resultant of the vectors computed in block 57. The two graphs adjacent block 60 illustrate the concept. STATOR FIELD is the vector sum of the three vectors B3, B6, and B9 which were previously computed in block 57. Two orthogonal vectors a and b are now computed, which are equivalent to that vector sum, namely, the STATOR FIELD. Parameter a is the length of a vector parallel with the x-axis. Parameter b is the length of a vector parallel with the y-axis.

FIG. 10 illustrates how this computation is performed, and is presented to illustrate one complexity in the prior art which the present invention eliminates, or reduces. FIG. 10 illustrates three generalized vectors I1, I2, and I3, which are illustrated across the top of FIG. 10. The overall procedure is to (1) compute the x- and y-coordinates for each vector, (2) add the x-coordinates together, and (3) add the y-coordinates together. The result is two orthogonal vectors.

As to the x-coordinates, as indicated at the top center of FIG. 10, the x-coordinate of I2 is I2(COS 120). As indicated at the top right, the x-coordinate of I3 is I3(COS 240). As indicated at the top left, the x-coordinate of I1 is I1(COS 180). These three x-coordinates are added at the lower left, producing a vector Ia.

As to the y-coordinates, as indicated at the top center of FIG. 10, the y-coordinate of I2 is I2(SIN 120). As indicated at the top right, the y-coordinate of I3 is I3(SIN 240). There is no y-coordinate for I1, because it always stands at either zero or 180 degrees. These y-coordinates are added at the lower right, producing a vector Ib.

FIG. 11 shows the two vectors Ia and Ib. Their vector sum is the STATOR FIELD, as indicated. These two vectors Ia and Ib correspond to the two vectors computed in block 60 in FIG. 9.

In block 70 in FIG. 12, rotor angle, theta, is measured. A shaft encoder (not shown) is commonly used for this task. Rotor angle is an angle which indicates the rotor field vector, either directly or through computation.

In block 80, the two vectors computed in block 60 in FIG. 9 are transformed into a coordinate system which rotates with the rotor. (The angle theta is continually changing.) The graphs adjacent block 80 illustrate the concept. The STATOR FIELD, as computed in block 60 in FIG. 9, is on the left, and has x-y coordinates of (a,b). Block 80 transforms the coordinates to a1 and b1, shown on the right, which are the coordinates for the same STATOR FIELD, but now in a rotating u-v coordinate system.

FIG. 13 illustrates how this transformation may be accomplished. Plot 100 illustrates a generalized point P, representing a generalized stator field vector, having coordinates (a, b) in an x-y coordinate system. Plot 105 illustrates how the u-coordinate, of value a1, can be computed for a rotated u-v coordinate system. Plot 110 illustrates how the v-coordinate, of value b1, can be computed for the rotated u-v coordinate system. Equations 115 summarize the results.

Parameters a1 and b1 are the variables computed by block 80 in FIG. 12. It is noted that coordinate b1 corresponds to a vector which is parallel to the LEADING ORTHOGONAL in the graph adjacent block 90. The significance of this will become clear shortly.

Block 90 in FIG. 12 computes the error, if any, between the STATOR FIELD (shown adjacent block 80) and the LEADING ORTHOGONAL in the plot adjacent block 90. The LEADING ORTHOGONAL is a vector which is perpendicular to the ROTOR FIELD, and leads the ROTOR field. In order to maximize torque, the stator field is controlled so that it continually remains aligned parallel with the LEADING ORTHOGONAL, also called the quadrature vector to the ROTOR FIELD. (In generator action, as opposed to motor action, the quadrature vector lags the ROTOR FIELD.) This evaluation is done in the rotating coordinate system u-v, as block 90 indicates.

Block 130 in FIG. 14 indicates that the vector coordinates of the required stator field are computed, but in the rotating coordinate system. The graph adjacent block 130 illustrates the concept. The NEEDED FIELD is that which is orthogonal with the ROTOR FIELD. In the graph, the STATOR FIELD illustrated is not orthogonal, and corrective action must be taken.

The coordinates computed in block 130 for the required stator field lie in the rotating u-v coordinate system. Block 135 transforms those coordinates into the stationary x-y coordinate system, using inverses of the operations shown in FIG. 13. The inverse operations are $x = u$ COS (theta) $- v$ SIN (theta)

$y = u$ SIN (theta) $+ v$ COS (theta)

Block 140 in FIG. 14 then computes the required voltages needed for the coils to attain the required stator field. In concept, block 135 specifies a vector analogous to resultant R1 in FIG. 4. Block 140 in FIG. 14 computes the voltages analogous to V3, V6, and V9 required to produce that vector R1.

The computation of block 140 is of the same type as that shown in FIG. 10. In the latter, two orthogonal vectors are derived which are equivalent to three vectors. In block 140, three vectors are derived from two orthogonal vectors.

Then the processes of FIGS. 9–14 are continually repeated during operation of the motor.

The preceding was a simplification. In practice, various prior art control strategies are used in the process of converging the stator field to the required stator field, that is, in reducing the error of block 90 to zero, by adjusting the currents in the coils. These control strategies were not discussed.

The Inventors have developed a less expensive approach to controlling a synchronous motor.

SUMMARY OF THE INVENTION

In one form of the invention, a two-phase motor is used to provide power assist for steering system in a vehicle. A control system of the FOC type is used, but one which requires no conversion of magnetic field vectors to equivalent orthogonal vectors.

BRIEF DESCRIPTION OF THE DRAWINGS

FIGS. 1–14 and 20 are labeled "Prior Art." FIG. 1 illustrates three coils, as used in a three-phase motor.

FIG. 2 illustrates magnetic fields generated in the coils of FIG. 1.

FIG. 3 illustrates three-phase waveforms.

FIGS. 4 and 5 illustrate two resultant vectors, at two different points in time, created by the waveforms of FIG. 3.

FIG. 6 illustrates that the resultant vector under discussion rotates about in a circle.

FIG. 7 is a schematic view of a synchronous motor.

FIG. 8 illustrates a schematic of a controller 50 used to control a prior-art three-phase synchronous motor.

FIGS. 9, 12, and 14 illustrate a flow chart explaining operation of the controller 50 of FIG. 8.

FIGS. 10 and 11 illustrate graphically the transform undertaken by block 60 in FIG. 9.

FIG. 13 illustrates graphically the transform undertaken by block 80 in FIG. 12.

FIG. 20 illustrates a WYE-connected coil set, and equations illustrating computations of voltage and power therein.

FIG. 22 illustrates how currents are initialized in the coils of the stator of FIG. 16, for each of the four Cartesian quadrants.

FIGS. 23–25 illustrate how a particular waveform can be generated.

FIG. 26 illustrates a sequence of the waveforms of FIG. 25.

FIG. 31 illustrates soft switching, used by the invention.

FIG. 32 illustrates how alteration of the duty cycle of switch SW in FIGS. 23–25 can create a different average voltage.

FIG. 33 illustrates three pulse trains applied to a WYE-connected coil set.

FIG. 35 illustrates various possible combinations of control systems and motors, for the main purpose of classifying the present invention.

DETAILED DESCRIPTION OF THE INVENTION

Figure 15:
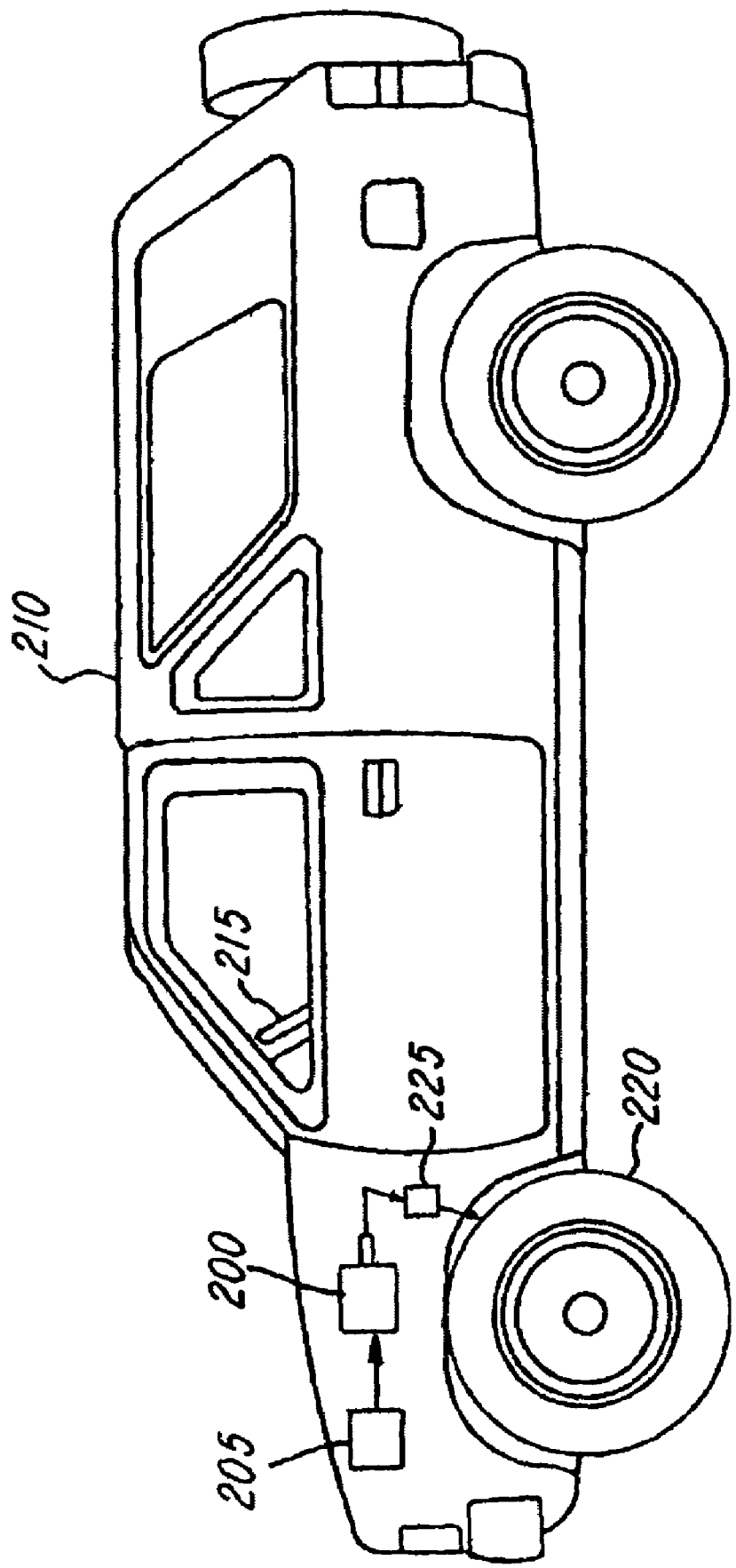
FIG. 15 illustrates one form of the invention.

FIG. 15 illustrates one form of the invention. A two-phase synchronous motor 200 is controlled by a controller 205. In one embodiment, the two-phase motor 200 is contained within a vehicle 210, and provides a steering assist, of the type commonly called "power steering." The controller 205 detects that the steering wheel 215 is calling for a turn of the forward wheels 220. The controller 205 orders the motor 200 to produce power as long as the change in direction of wheels 220 is being made. Motor 200 turns the wheels 220 through a linkage 225.

Figure 16:
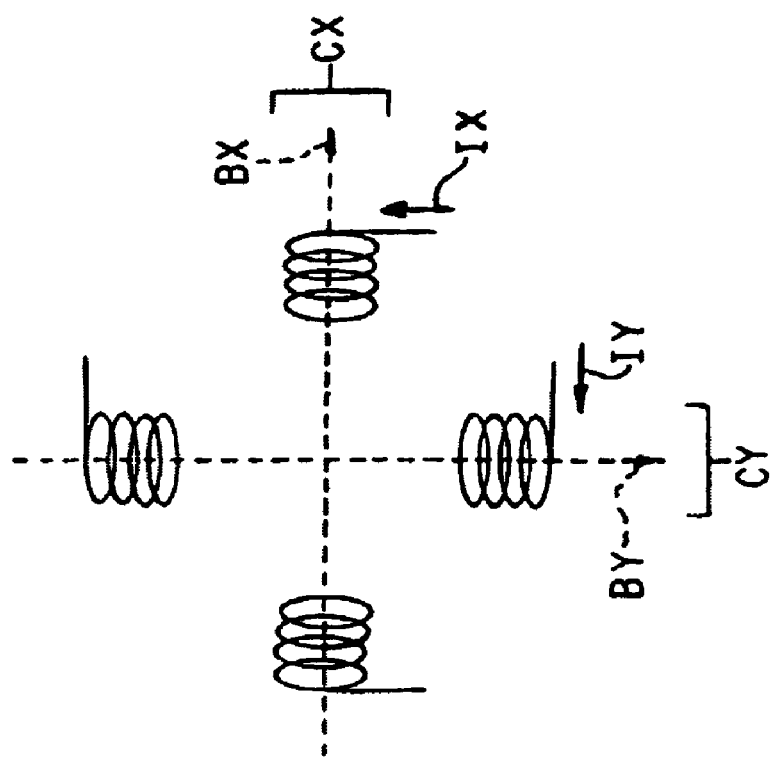
FIG. 16 is a schematic of the stator of a two-phase motor.

A two-phase synchronous motor has two stator coils CX and CY, as in FIG. 16, which are physically located at 90 degrees to each other. The two coils CX and CY thus produce magnetic fields BX and BY which are also 90 degrees from each other.

If proper currents IX and IY are applied to the coils 210 and 215, they produce magnetic field vectors which add vectorially to a single rotating magnetic field vector, of constant magnitude and constant angular velocity. For example, if the current IX is described by the expression COS T and the current IY described by SIN T, then their sum is a resultant RSUM. The preceding sentence described the equation RSUM=COS T+SIN T, defines a circle, in parametric terms, the parameter being T.

Unlike the three-phase case of FIG. 8, the two-phase motor 200 of FIG. 15 contains coils which are unconnected with each other. That is, the current IX in FIG. 16 can be controlled independently of IY, and those currents are the only stator currents in the motor which drive the rotor. Restated, all currents in the coils are controllable independently.

Figure 17:
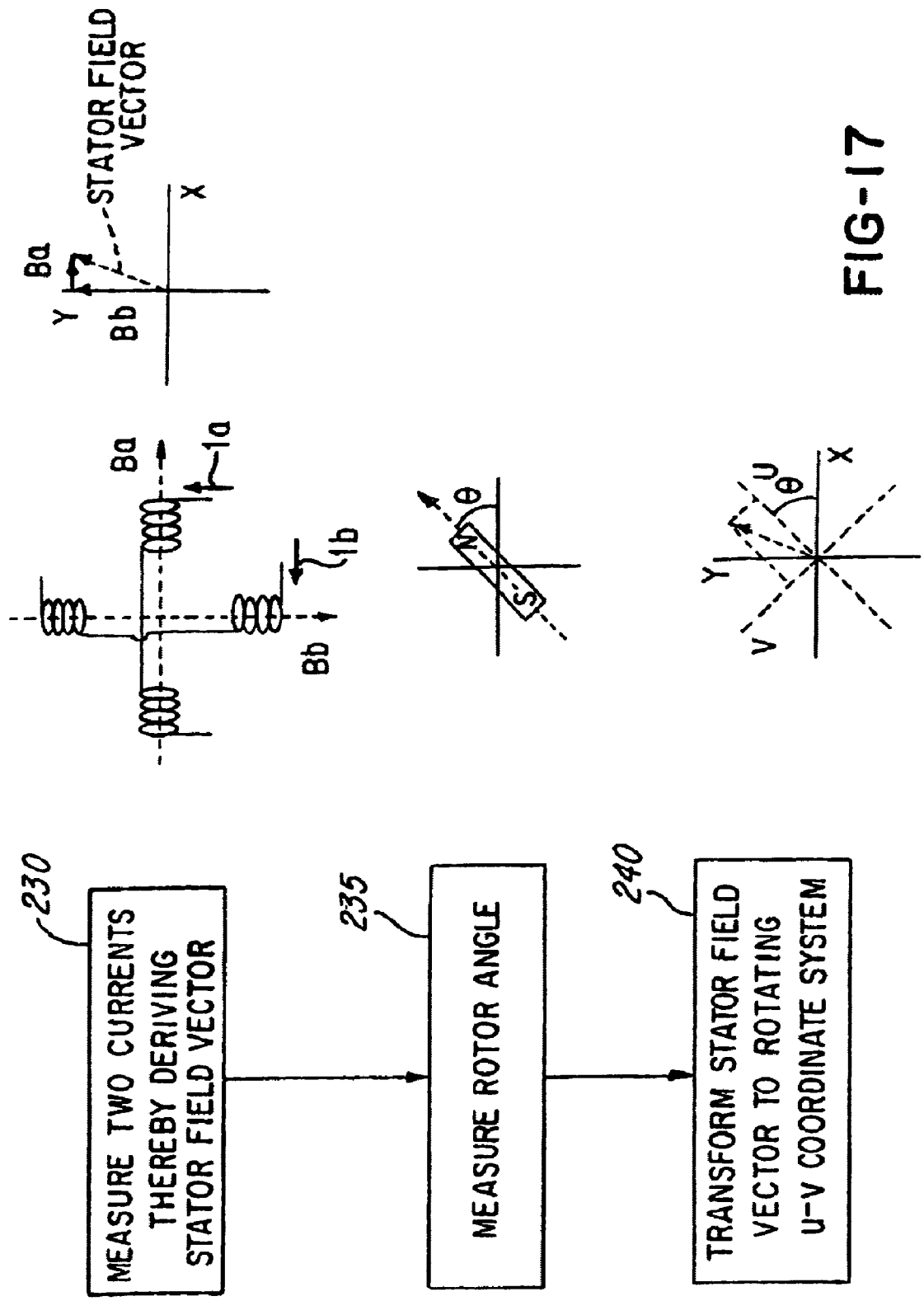
FIGS. 17 and 18 are flow charts describing processes undertaken by one form of the invention.
Figure 18:
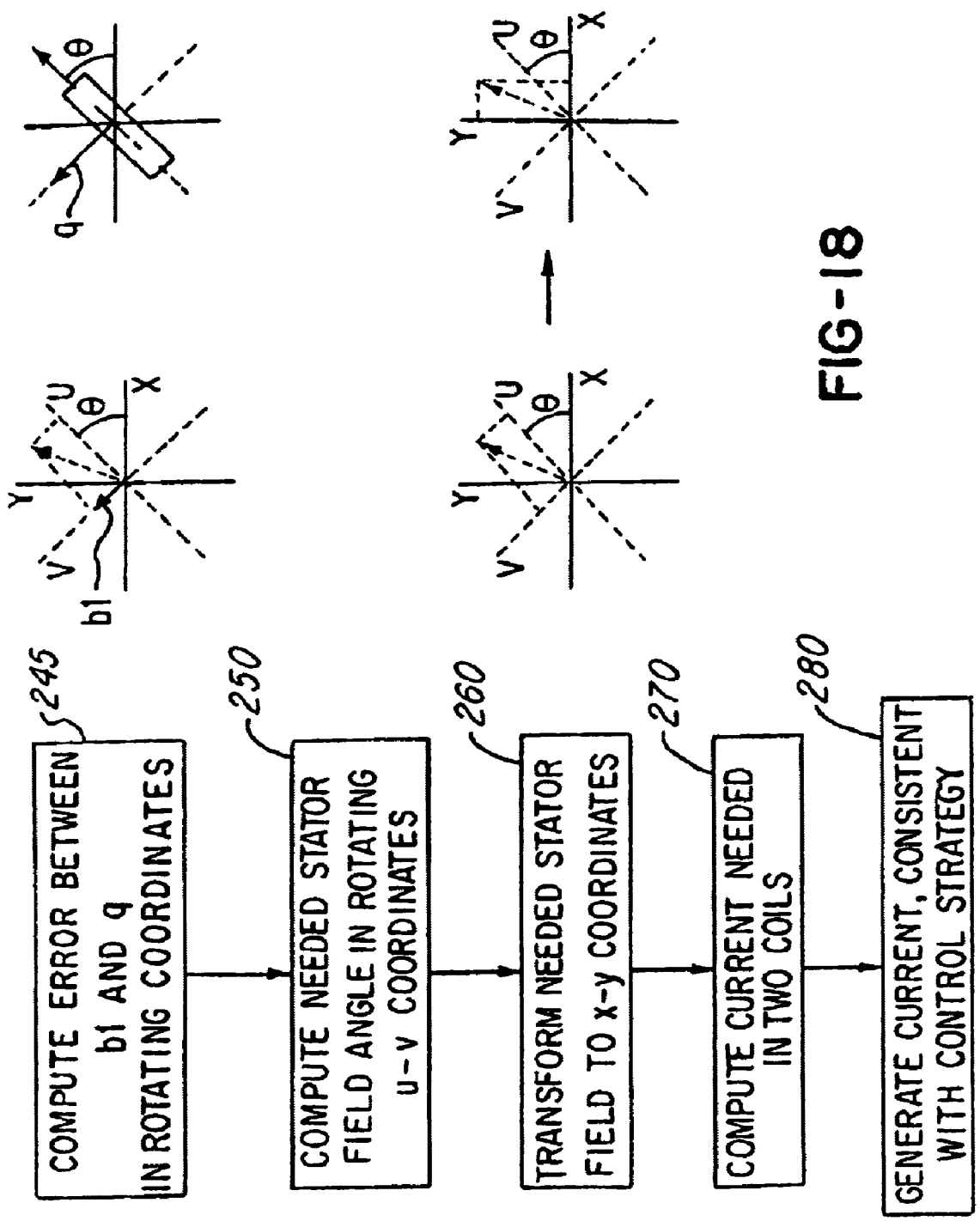
Figure 19:
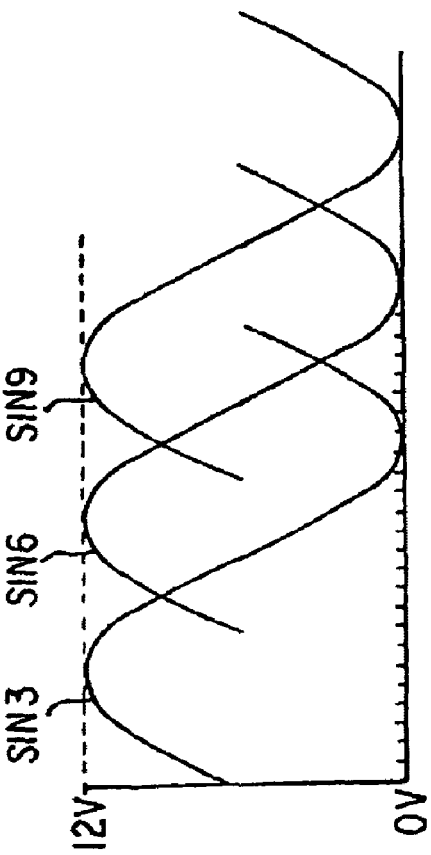
FIG. 19 illustrates a three-phase waveform.

The controller 205 in FIG. 15 undertakes the processes illustrated in FIGS. 17–19. In block 230 in FIG. 17, the currents IX and IY in FIG. 16 are measured. FIG. 17 uses the conventional symbology of Ia and Ib.

These currents produce magnetic fields Ba and Bb which are 90 spatial degrees apart, as indicated. Thus, measurement of the currents Ia and Ib directly indicates the STATOR FIELD VECTOR, because the magnetic fields Ba and Bb equal the currents multiplied by a constant (outside saturation).

Figure 9:
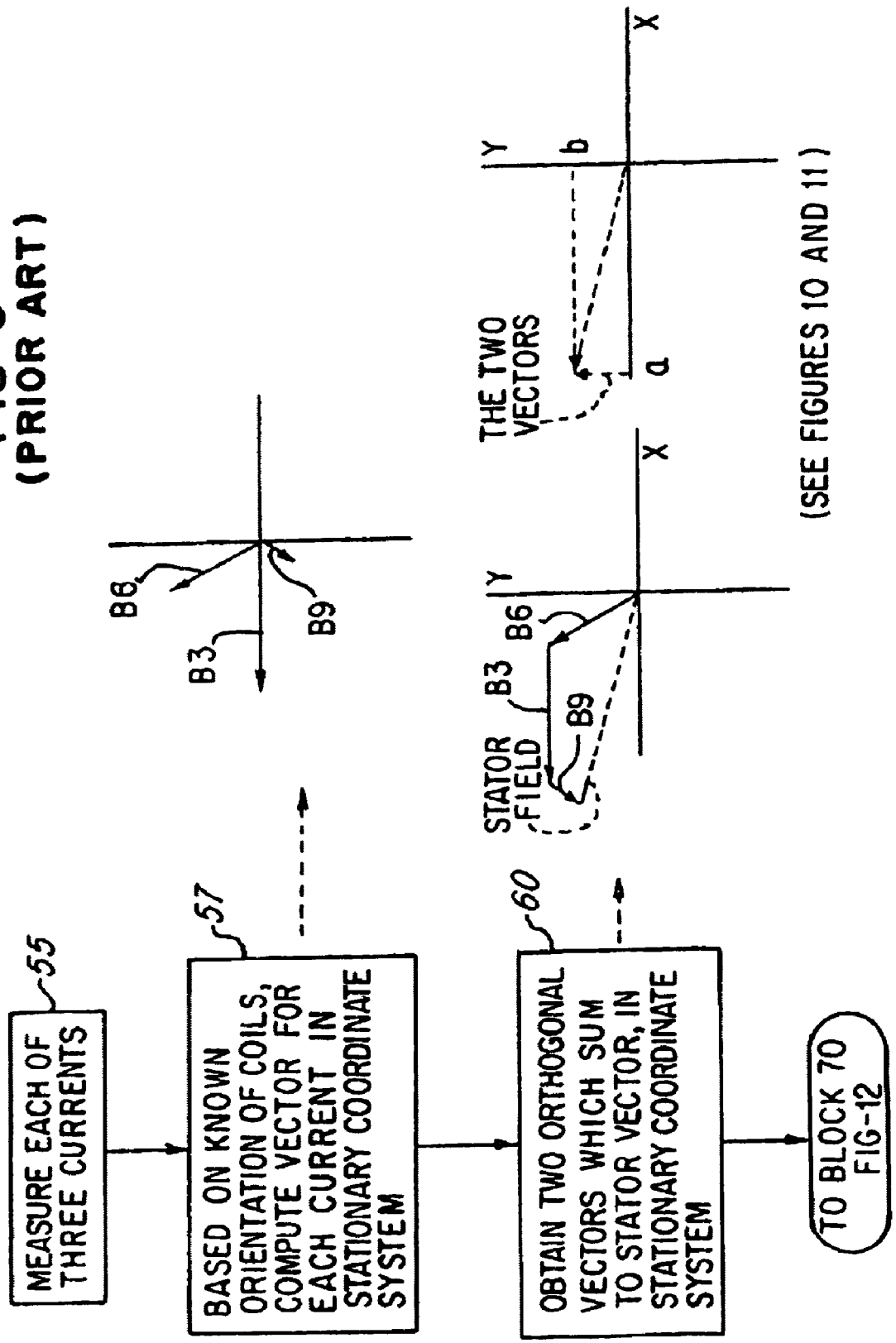
Figure 10:
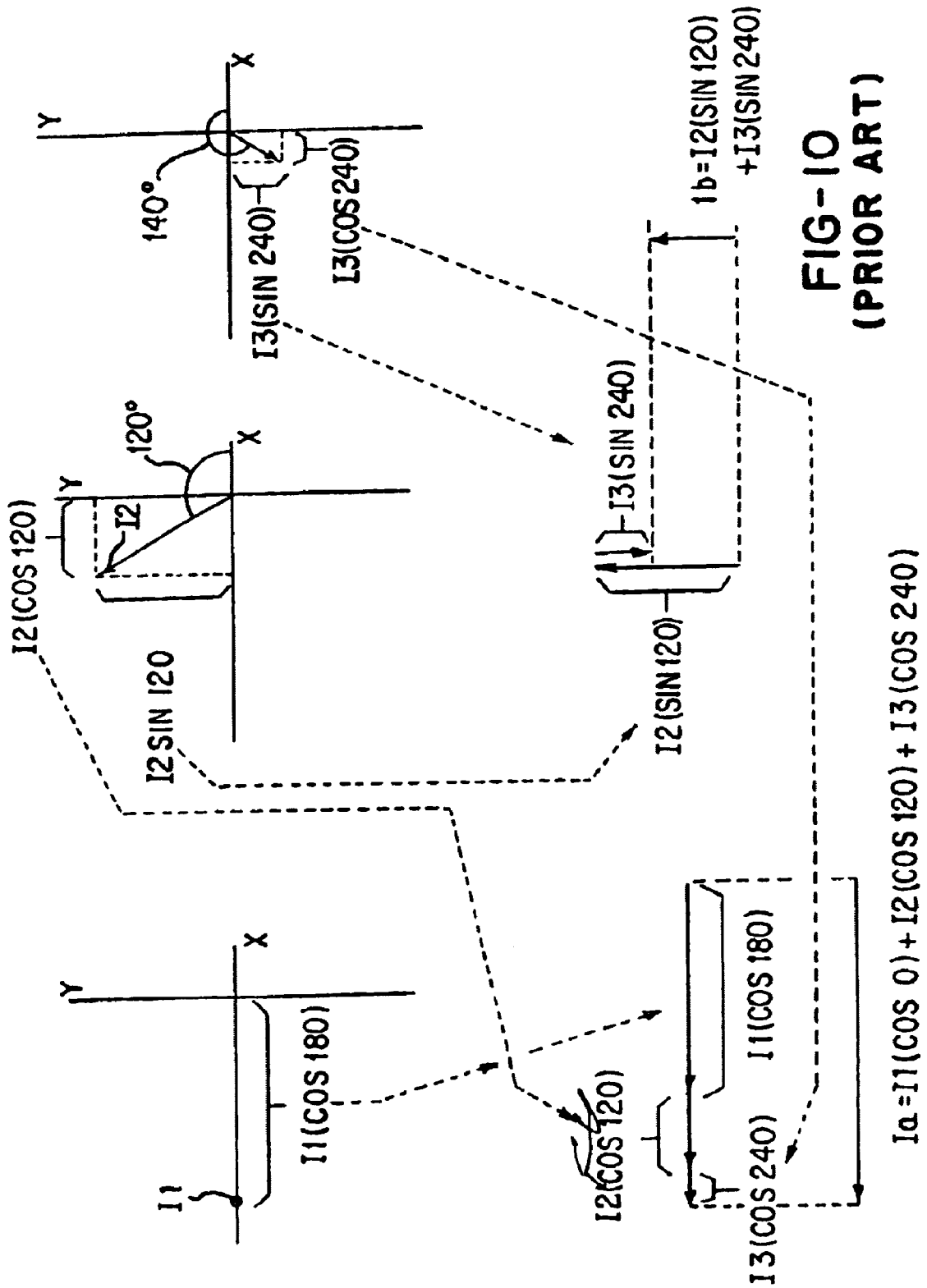
Figure 11:
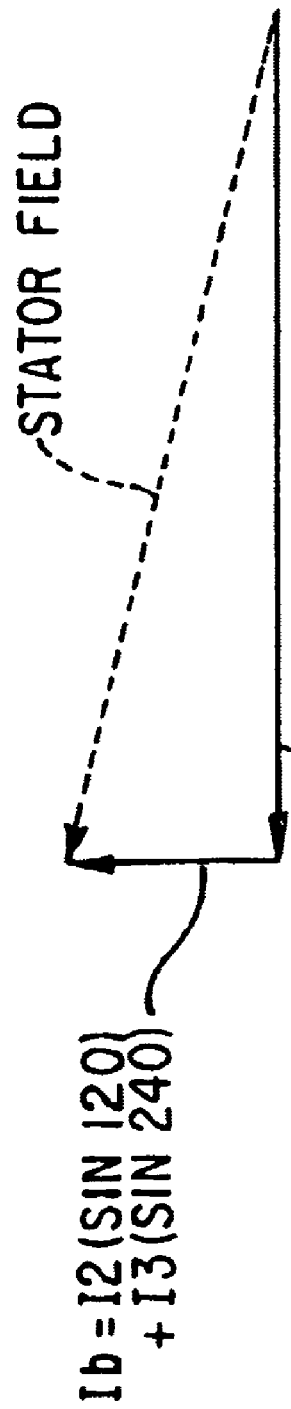
Figure 12:
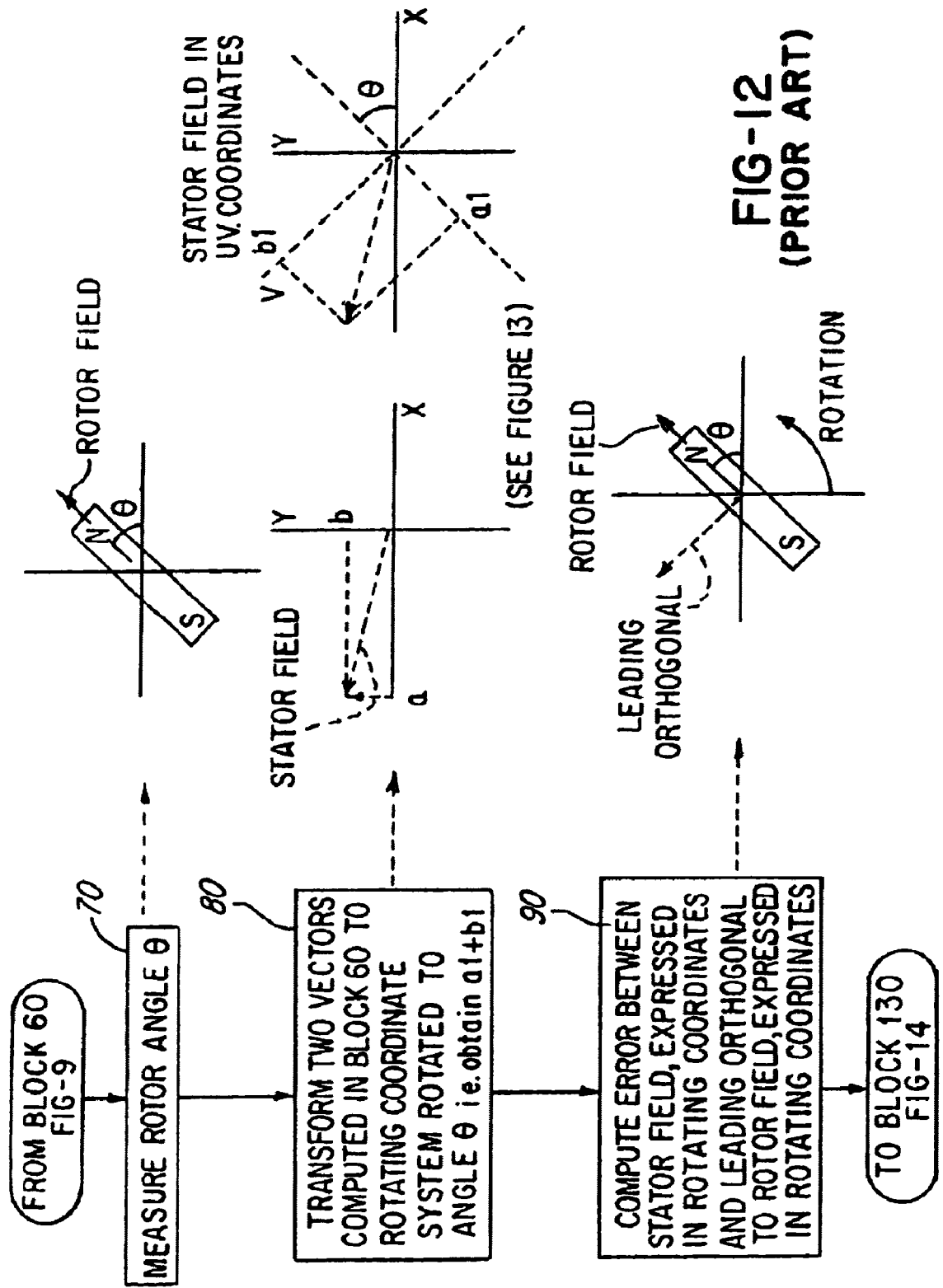

That is, any need for the transformation of block 60 in FIG. 9, and shown in FIGS. 10 and 11, is eliminated. Under the invention, two vectors, analogous to Ia and Ib in FIG. 11, are read directly by block 230 in FIG. 16. Restated, two orthogonal currents, and by implication two orthogonal magnetic fields, which sum vectorially to the STATOR FIELD VECTOR adjacent block 230 in FIG. 17, are read directly by block 230. These two currents reside in the stationary x-y coordinate system.

Figure 13:
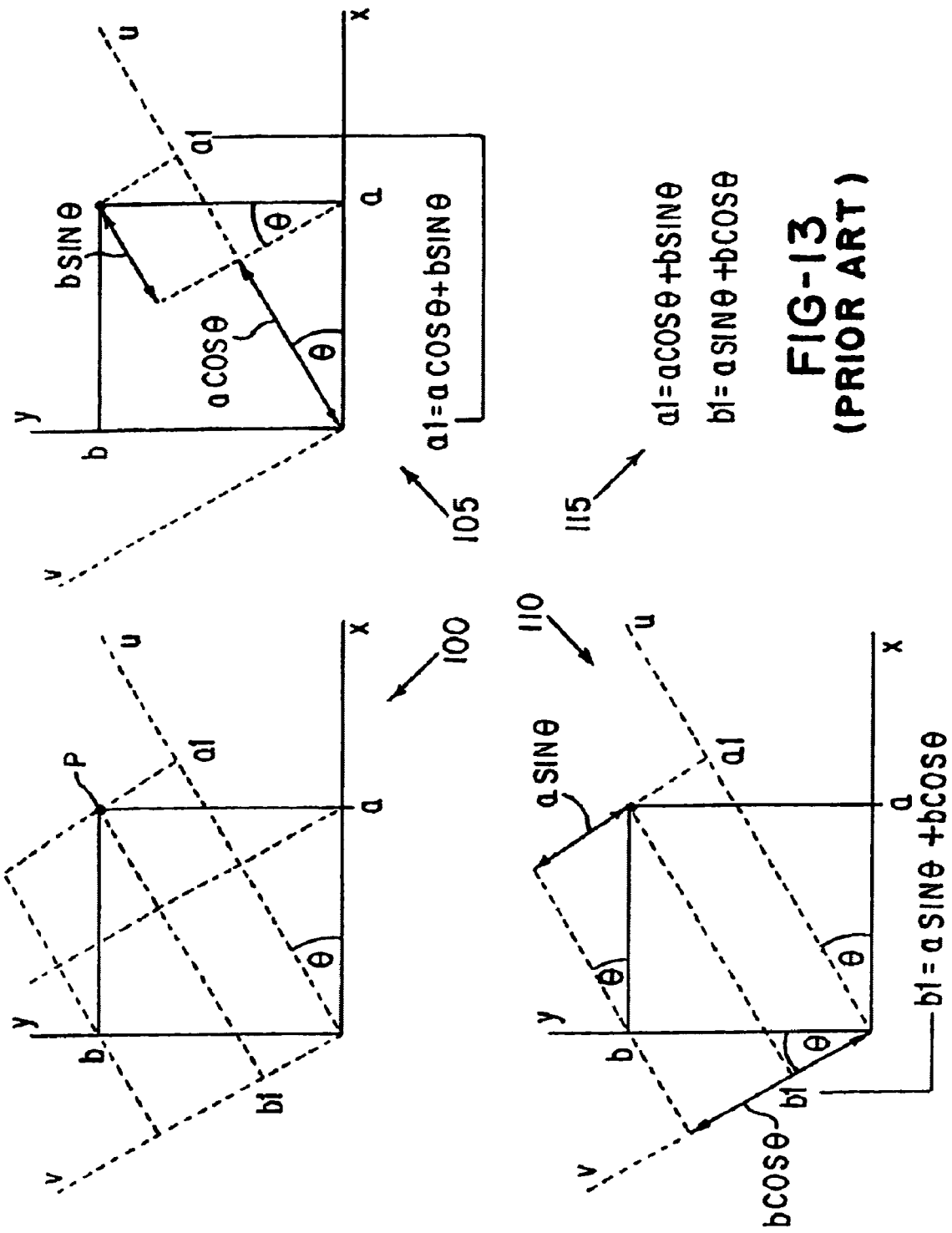

In block 235 in FIG. 17, rotor angle, theta, is measured. In block 240, Ia and Ib are transformed into a rotating u-v coordinate system positioned at rotor angle theta, as indicated. FIG. 13 illustrates the type of transformation.

In block 245 in FIG. 18, the error between (1) the stator angle, in rotating u-v coordinates, and (2) the LEADING ORTHOGONAL, also in rotating u-v coordinates, is computed. This computation seeks the difference in angle between b1 and q, both adjacent block 245.

Block 250 in FIG. 18 computes the needed stator angle, i.e., the required stator magnetic field vector, in rotating u-v coordinates.

Block 260 in FIG. 18 transforms the required stator angle from rotating u-v coordinates to stationary x-y coordinates, using a known transform, such as the inverse discussed in the Background of the Invention, in connection with FIG. 13.

Figure 14:
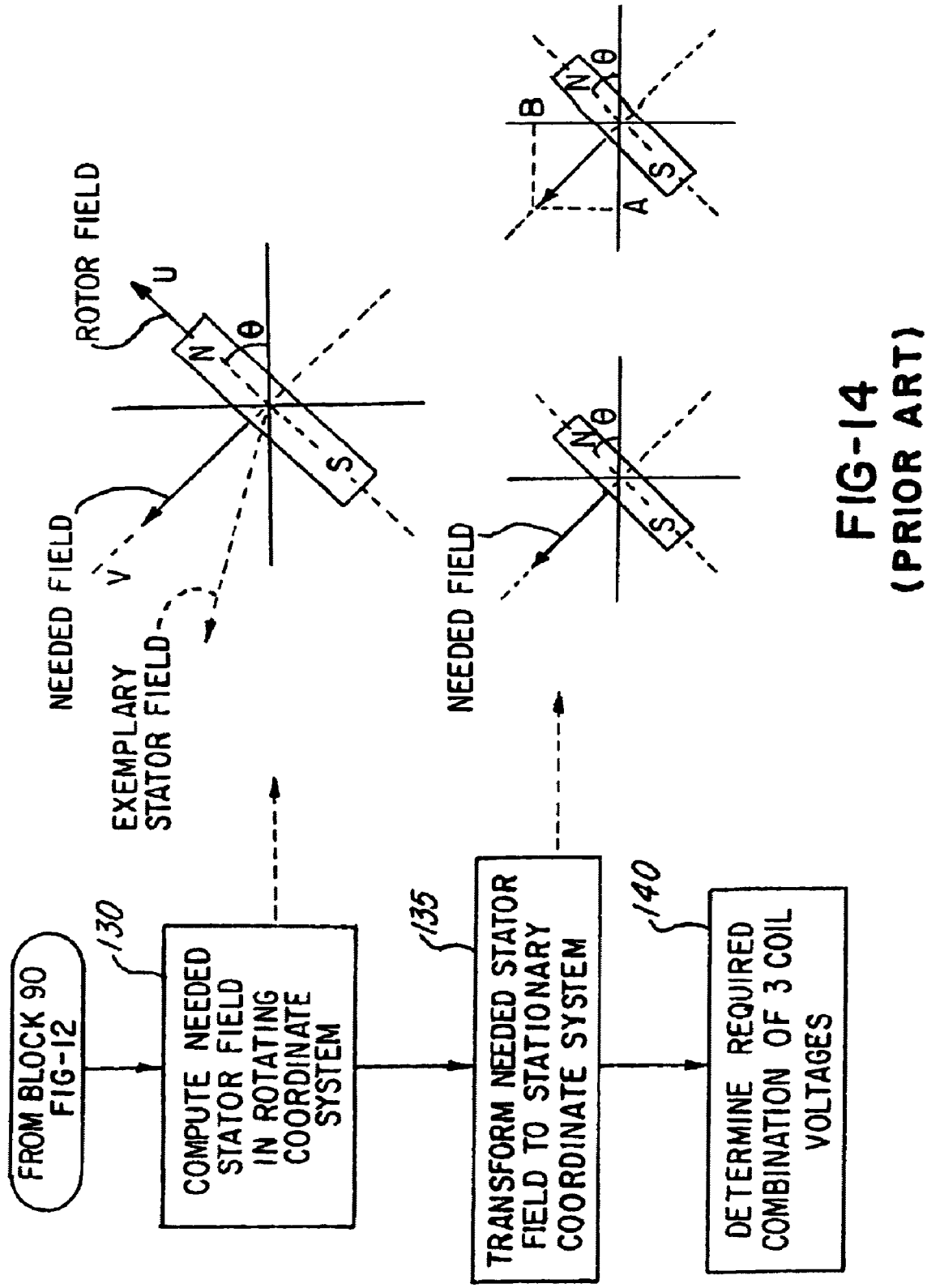

Block 270 computes the required currents. At this point, the currents required in the two stator coils CX and CY in FIG. 16 are known directly. There is no requirement for a transformation of the type indicated in block 140 in FIG. 14. That type of transformation, wherein two orthogonal vectors in x-y coordinates are converted to an equivalent set of three vectors in x-y coordinates, is, as stated, not necessary.

Block 280 in FIG. 18 indicates that currents are generated in the coils, and the particular instantaneous currents generated depend on the control strategy used. Thus, block 280 is closely related to block 270. An example will illustrate this.

Consider a single cycle through the processes described by the flow chart of FIGS. 17 and 18. During that cycle, assume that the quadrature vector q adjacent block 245 in FIG. 18 is computed at 120 degrees. Assume that the STATOR FIELD VECTOR adjacent block 230 in FIG. 17 is computed at 110 degrees, or ten degrees away from its desired position.

The question then arises on how to reduce this error of ten degrees. Should it be gradually and linearly done over the next, say, ten seconds? Or should the error be reduced as rapidly as possibly? Or should the error be reduced extremely rapidly at first until it reaches, say, one degree, and then reduced gradually?

Each of the three approaches has advantages and disadvantages, in terms of stability, overshoot, behavior under other conditions, and other factors. Thus, the particular actions taken in blocks 270 and 280, once the error is computed, depend on the particular control strategy used. As later discussed, in one embodiment, a Proportional Integral, PI, strategy is preferred.

Additional Considerations

1. One advantage of the invention is that it produces more power, for a given supply voltage, compared with the prior art. Assume that the three-phase voltage synthesized in a vehicle having a 12-volt battery corresponds to that in FIG. 19. Zero volts is only taken as a reference. It is a fact of engineering that, in the WYE-connected system of FIG. 20, the voltage across any phase, Vp, equals the line voltage divided by the square root of 3, assuming balanced conditions wherein zero current flows in the neutral line. (The square root of 3 will be taken as 1.7 herein.) The line voltage is that between any two lines, such as Va and Vb.

Figure 20:
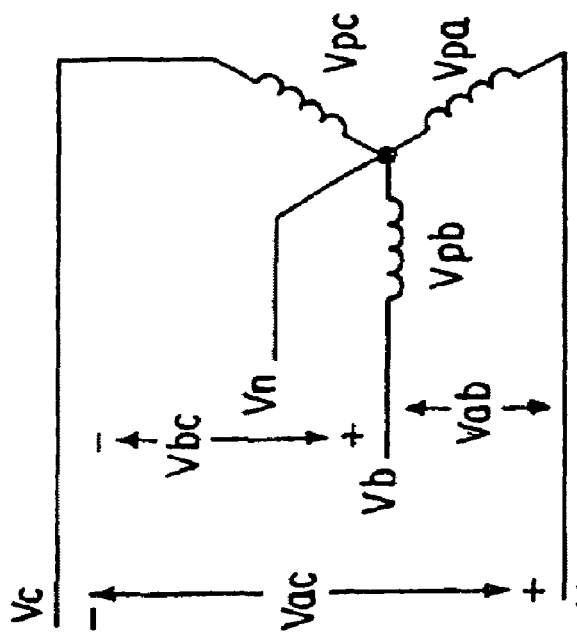

In general, for a motor vehicle application, the maximum line voltage available in FIG. 19 will be the vehicle system voltage of 12 volts. (Of course, separate power supplies could be provided which deliver a different voltage. Nevertheless, some system voltage exists which will equal the line voltage.) Thus, the maximum voltage which can be applied to any coil in the stator represented in FIG. 20 is about 12/1.7, or 6.9 volts. In contrast, the maximum voltage which can be applied by the invention to each coil CX and CY in FIG. 16 is the full line voltage of 12 volts.

This is significant because, at any given stage of technology in a society, the wiring available to construct the coils is the same in both cases of FIG. 16 and FIG. 20. Thus, for a given physical coil, the invention provides (1) a voltage across the coil which is 1.7 times larger, (2) a current which is 1.7 times larger, and (3) thus a magnetic field which is 1.7 times larger, compared with FIG. 20.

If the system of FIG. 20 is to provide the same magnetic field per coil as the invention, then larger diameter wire must be used in the coils. Or wire of lower resistance, and thus higher cost, must be used. Or a higher voltage must be used. All to overcome the factor of 1.7 just discussed.

FIG. 20 also illustrates another fact of engineering, namely, that the power delivered in a WYE-connected system equals Vline times Iphase, multiplied by the square root of 3. (If the phases were connected in parallel, then the total power delivered would be three times that produced by an individual phase.) In contrast, the invention, using two coils in FIG. 16, delivers total power equaling twice the produced by each phase.

2. A second characteristic of the invention relates to the soft switching techniques utilized. First, a generalized explanation of creation of sinusoidal voltages through switching techniques will be explained.

Figure 21:
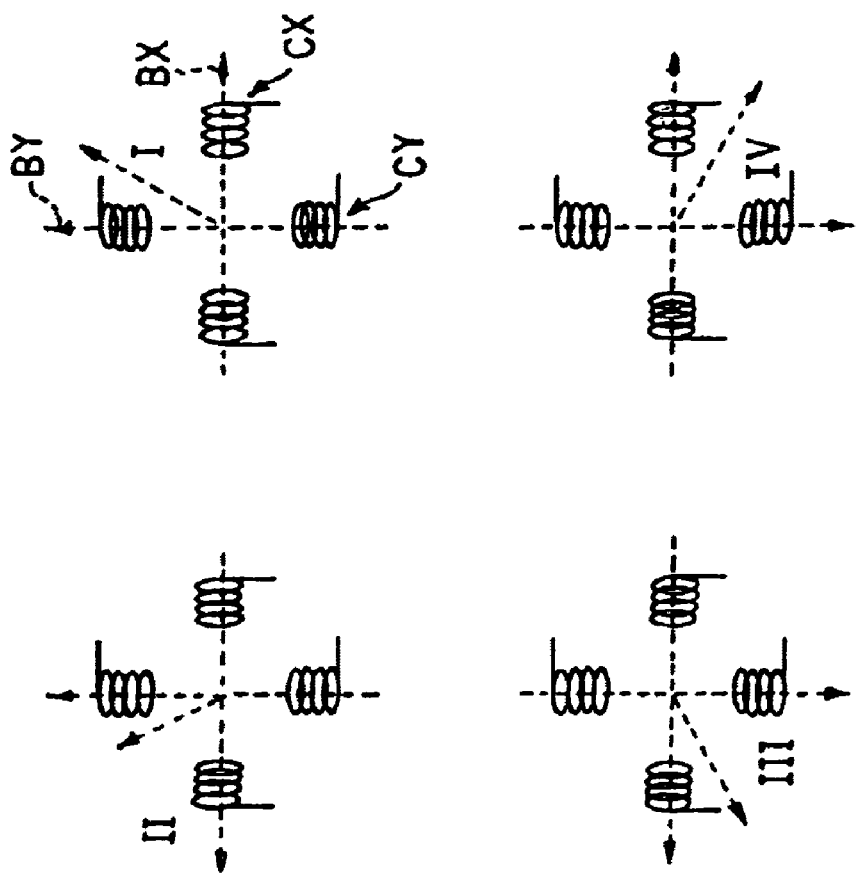
FIG. 21 illustrates directions of currents in the two-phase motor of FIG. 16, for each of the four Cartesian quadrants.

FIG. 21, adjacent FIG. 16, illustrates the direction of the currents passing through coils CX and CY in each of the four Cartesian quadrants, I–IV. The dashed vector in each quadrant represents the generalized sums of the currents, and is used to illustrate direction only.

FIG. 22 illustrates the H-bridges used to generate the currents in each quadrant I–IV, and is considered self-explanatory. These H-bridges generate sinusoidal currents in the coils CX and CY of FIG. 16, as will now be explained.

FIG. 23 illustrates an RL circuit, with a switch SW connected to ground. If, in FIG. 24, the switch SW is connected to the supply voltage of 12 volts, the output current will rise exponentially, as shown in FIG. 24. The parameter T is the time constant, which depends on the values of R and L. The graph follows the form $I=12-12 \times \mathrm{EXP}(-t*T)$, wherein t is time and T is the time constant.

If the switch SW is grounded at 5 T, as in FIG. 25, then I decays exponentially to zero, as indicated.

If the switch SW alternates between the two positions every 5 T, the waveform of FIG. 26 is generated.

Figure 27:
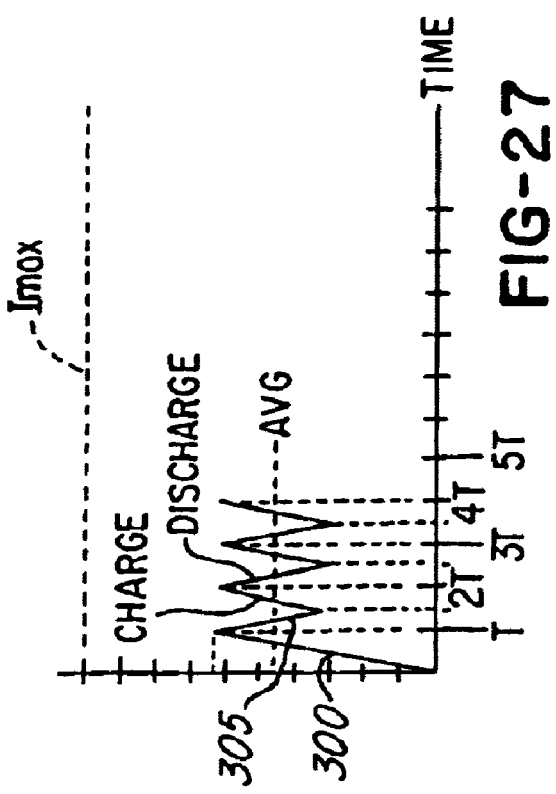

Assume that the switch SW initially was in the position of FIG. 23, and then is moved to the position of FIG. 24. As shown in FIG. 27, current I rises, and follows path 300. Assume now that, at time T (one time constant later), switch SW is grounded, as in FIG. 25. Now I starts to decay, along path 305 in FIG. 27. Assume that switch SW is re-connected to 12 volts at 1.5 T. I now rises again.

As indicated in FIG. 27, inductor L is alternately charged (when switch SW is connected to 12 volts) and discharged (when switch SW is connected to ground.) However, inductor L is not allowed to completely charge, or completely discharge.

If this alternation of position of switch SW, every 0.5T, is maintained, the sawtooth waveform of FIG. 27 will be created. That waveform has an average AVG.

Figure 28:
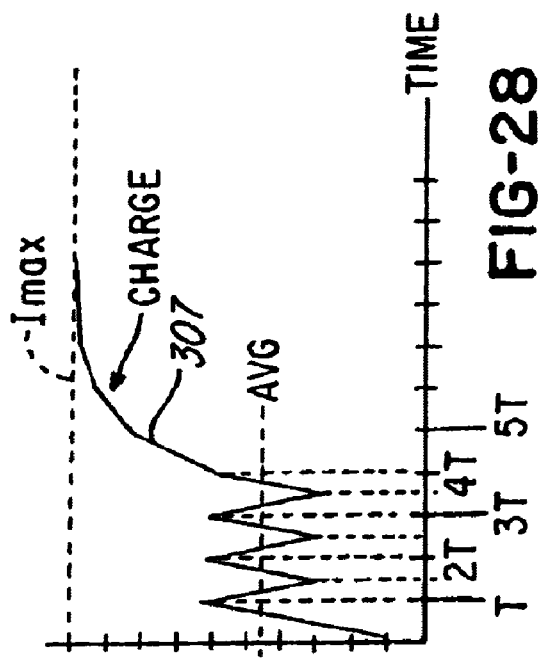
FIGS. 27–29 illustrate how different average voltages can be generated by adjusting the duty cycle of the switch SW in FIGS. 23–25.
Figure 29:
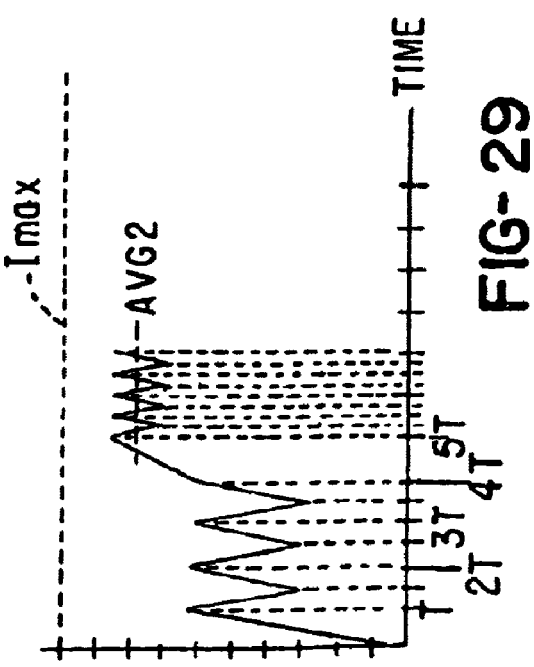

Now assume that, in FIG. 28, switch SW is not grounded at time 4T. I will attempt to rise exponentially to Imax, and attempt to follow path 307. Assume that, at 5T, the oscillation of switch SW is resumed, but now every 0.25T. The sawtooth waveform of FIG. 29 will be obtained, having a different average voltage AVG.

Figure 30:
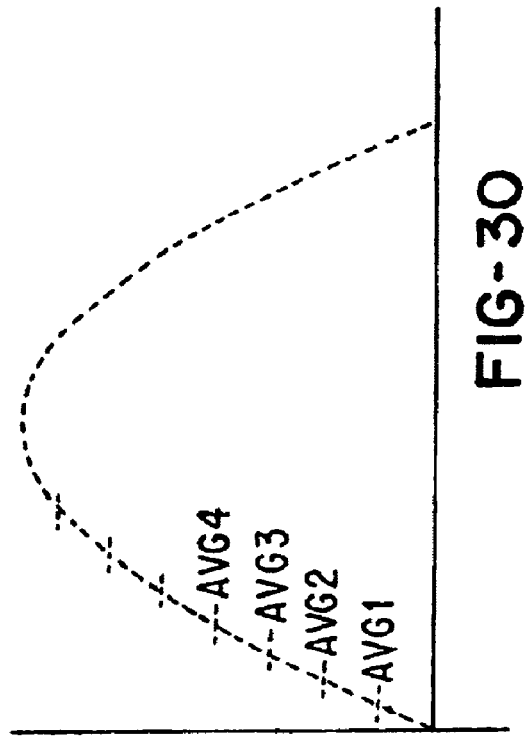
FIG. 30 illustrates how the average voltages described in connection with FIGS. 27–29 can be caused to generate a sequence which describes a sine wave.

In the general case, by adjusting the duty cycle at which switch SW opens and closed, one can adjust the average current produced. If the timing is chosen properly, one can generate a sinusoidal waveform, such as that shown in FIG. 30. That is, one chooses the proper duty cycles, and arranges them in the proper sequence, to produce the sequence represented by AVG1, AVG2, and so on in FIG. 30.

This can be explained from another perspective. FIG. 32 is another representation of the switching events of switch SW in FIG. 23, but with the switch SW absent in FIG. 32. Instead, the voltage created at point Pin by the switch SW is plotted.

In plot 350, Pin is held at 12 volts, except for brief intervals such as 355, wherein Pin is driven to zero volts. This is a large duty cycle. Thus, current I can be thought as being held at Imax, which equals the input voltage divided by R, except for the brief intervals 355, at which it attempts to exponentially fall to zero. However, before current I falls very far, Pin is again raised to 12 volts. Thus, Iout is kept at the relatively high average voltage 360, which is slightly below Imax.

Conversely, in plot 375, Pin is held at zero volts, except for brief intervals such as 380, wherein Pin is driven to 12 volts. This is a low duty cycle. Thus, current I can be thought as being held at zero, except for the brief intervals 380, at which it attempts to exponentially rise to Imax. However, before current I rises very far, Pin is again dropped to zero volts. Thus, current I is kept at the relatively low average voltage 390, which is slightly above zero.

In a similar manner, plot 400 causes current I to remain at average voltage 410, between the two extremes just described. In the general case, the average voltage of current I depends on the relative duration of intervals 355 and 380, or the duty cycle.

Under the invention, the type of switching just described is undertaken using the switches of FIG. 22, to create sinusoidal currents in the coils of the 2-phase motor. Further, "soft switching" is used.

In the opposite, namely, "hard switching," switch 450 in FIG. 22 would be repeatedly opened and closed, analogous to switch SW in FIG. 23, in order to develop an average waveform of the current through coil CX of the proper value.

Whenever switch 450 is opened, the voltage at point PH tends to jump to a high value. To accommodate this jump, a diode D is provided, connected between PH and the 12 volt line. The jumping voltage now generates a current which is fed back to the power supply. A diode is provided for each switch in FIG. 22, the switches taking the form of transistors.

In soft switching, current through the coil, for example coil CX in quadrant I in FIG. 31, is handled by first charging coil CX through a closed switch 500. A rising current is generated, which is supplied by a DC bus capacitor (not shown) analogous to rising current 300 in FIG. 27. A similar rising current is generated in coil CY, and supplied by the same bus capacitor (not shown). As explained later, the clocks for coils CX and CY are not simultaneous, although possibly of identical frequency. This lack of simultaneity eliminates any requirement that the bus capacitor supply two rising currents together, to both coils CX and CY at once. The bus capacitor supplies CX and then CY.

Then, switch 500 in FIG. 31 is opened and switch 505 is simultaneously closed, allowing the existing current to discharge, analogous to the falling current 305 in FIG. 27.

Repetition of the process shown in FIG. 31, indicated by arrow 515, generates a current having an average value in coil CX, analogous to the situations of FIGS. 27–32.

From another point of view, a voltage is first applied to coil CX, which generates a rising current. Then, the voltage is removed, and a resistance is placed in parallel with CX, to absorb the current present, which then decays. That resistance includes the resistance of switch 505, 510, and components between them external to the H-bridge. Further, resistance within coil CX dissipates some energy.

Similar soft-switching occurs in the other quadrants of FIG. 31, as indicated by the horizontal double-ended arrows.

3. A significant feature of the invention is that the voltages applied to coils CX and CY in FIG. 16 need not be synchronized. That is, each coil CX and CY carries its own current, and generates its own field vector B, without regard to the other. Of course, in one mode of operation, the currents are arranged to work together to generate a rotating field vector.

Nevertheless, the currents in each coil are in many respects independent. For example, the exact frequency at which the switches are cycled in FIG. 31 are independent for coil X, compared with coil Y. For example, the switching of coil X may be 20 KHz, and coil CY may be 21 KHz. Further, those frequencies need not be related, nor synchronous. This will be explained in the context of the prior-art 3-phase case.

Figure 34:
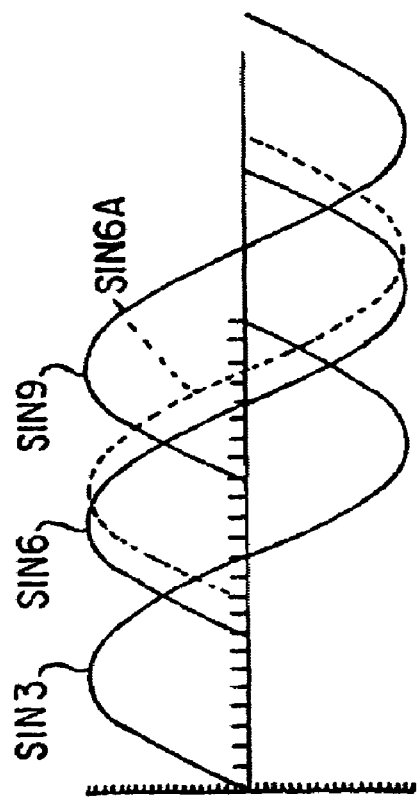
FIG. 34 illustrates a shift of a waveform in a three-phase set.

In FIG. 33, three voltages are applied to three coils in a WYE-connected system. However, the rising edges of the voltages must be synchronized, as indicated by dashed line 550. That is, if pulse train 400B were shifted by time T1, that would have the effect of shifting the phase of SIN6 to SIN6A in FIG. 34. That phase shift cannot be allowed, because that would alter the voltages applied to the other coils in FIG. 33. Restated, that shift would create unbalanced operation in the WYE-connected system.

4. FIG. 35 illustrates several columns of options available to a designer of a motor system. The designer would select the appropriate elements from each column, to design a system. Of course, some elements are incompatible with others. For example, speed control through control of the rotor field, by adjusting voltage, is not, in general, applicable to a stepper motor, which can be classified as a switched-reluctance motor.

The present invention utilizes a specific combination of elements in FIG. 35, namely, a two-phase motor having a synchronous type stator, as indicated. Also, a buried permanent magnet rotor is possible. The control system implements Field-Oriented Control, FOC, to maintain the stator field in quadrature with the rotor field.

5. The invention reduces computation required, by eliminating the transformations from a three-phase reference frame, to a two-phase frame, and the converse transformations. One quantitative measure of the saving in computation is the following.

Figure 2:
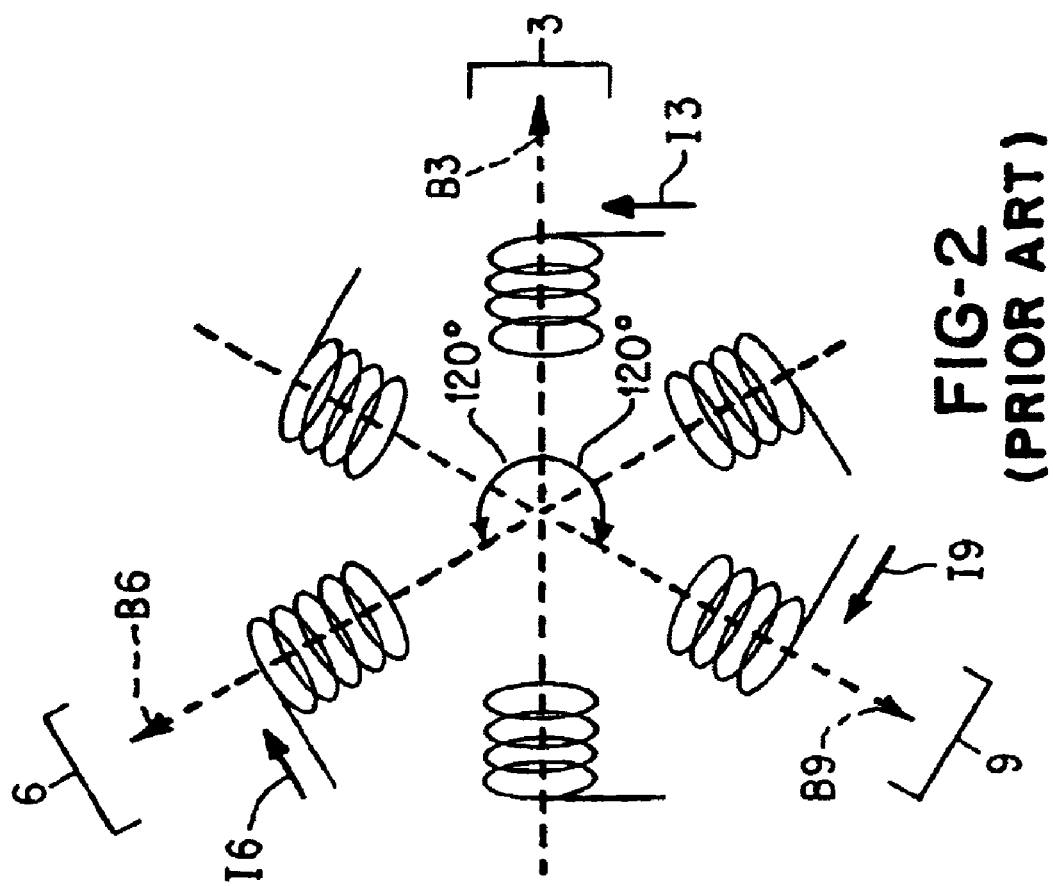
Figure 1:
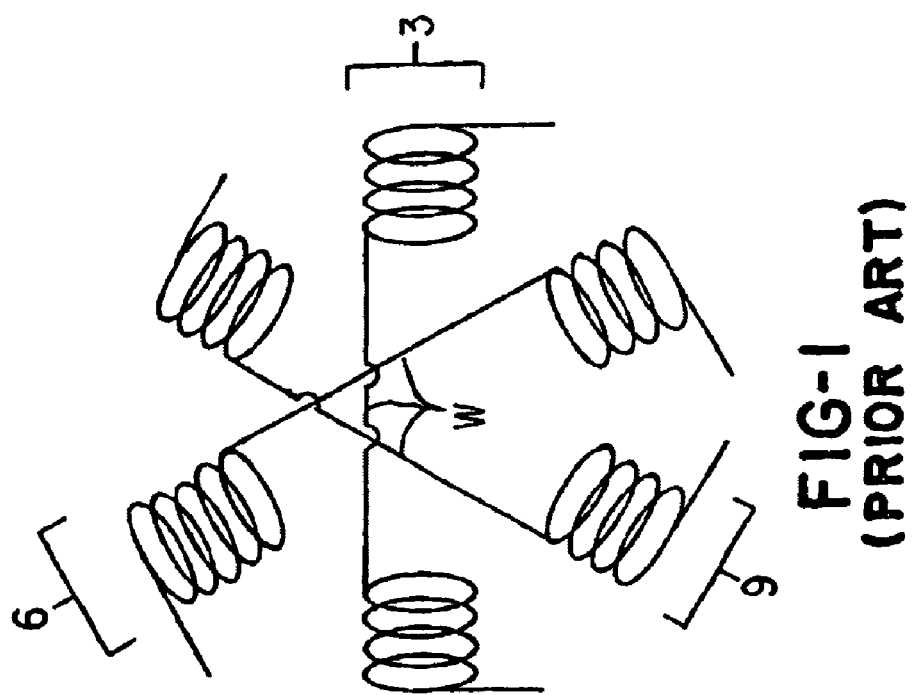
Figure 3:
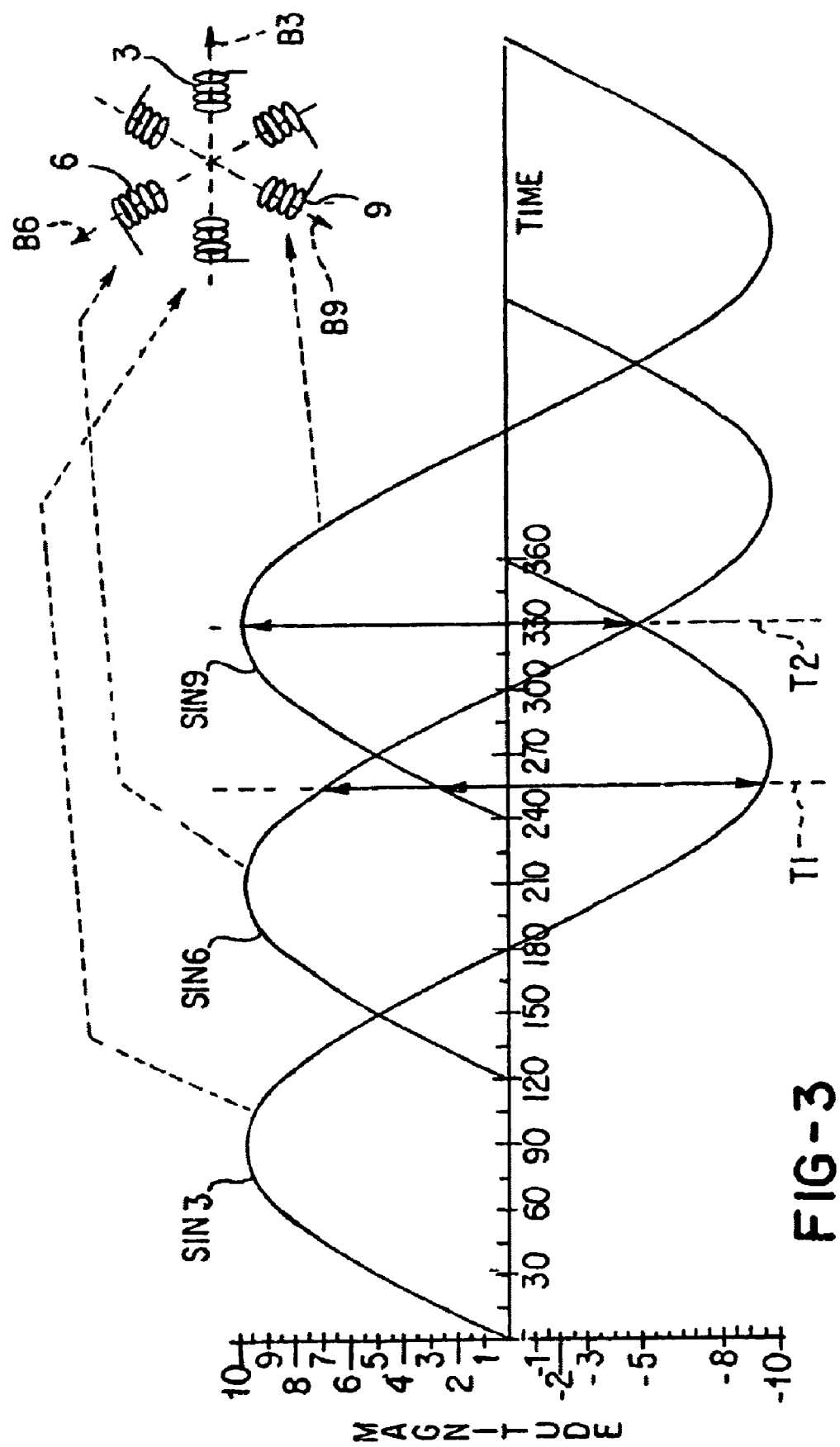
Figure 4:
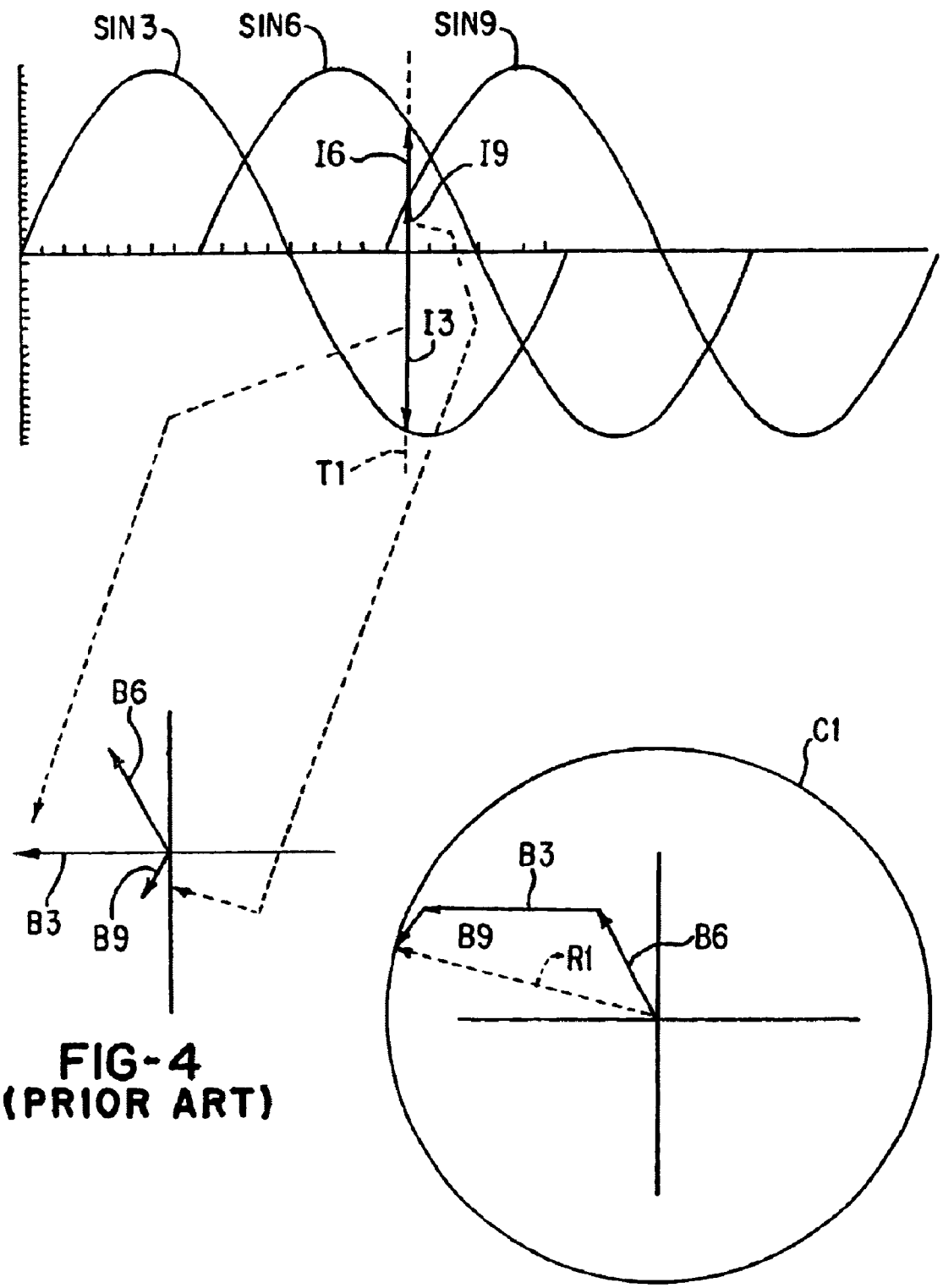
Figure 5:
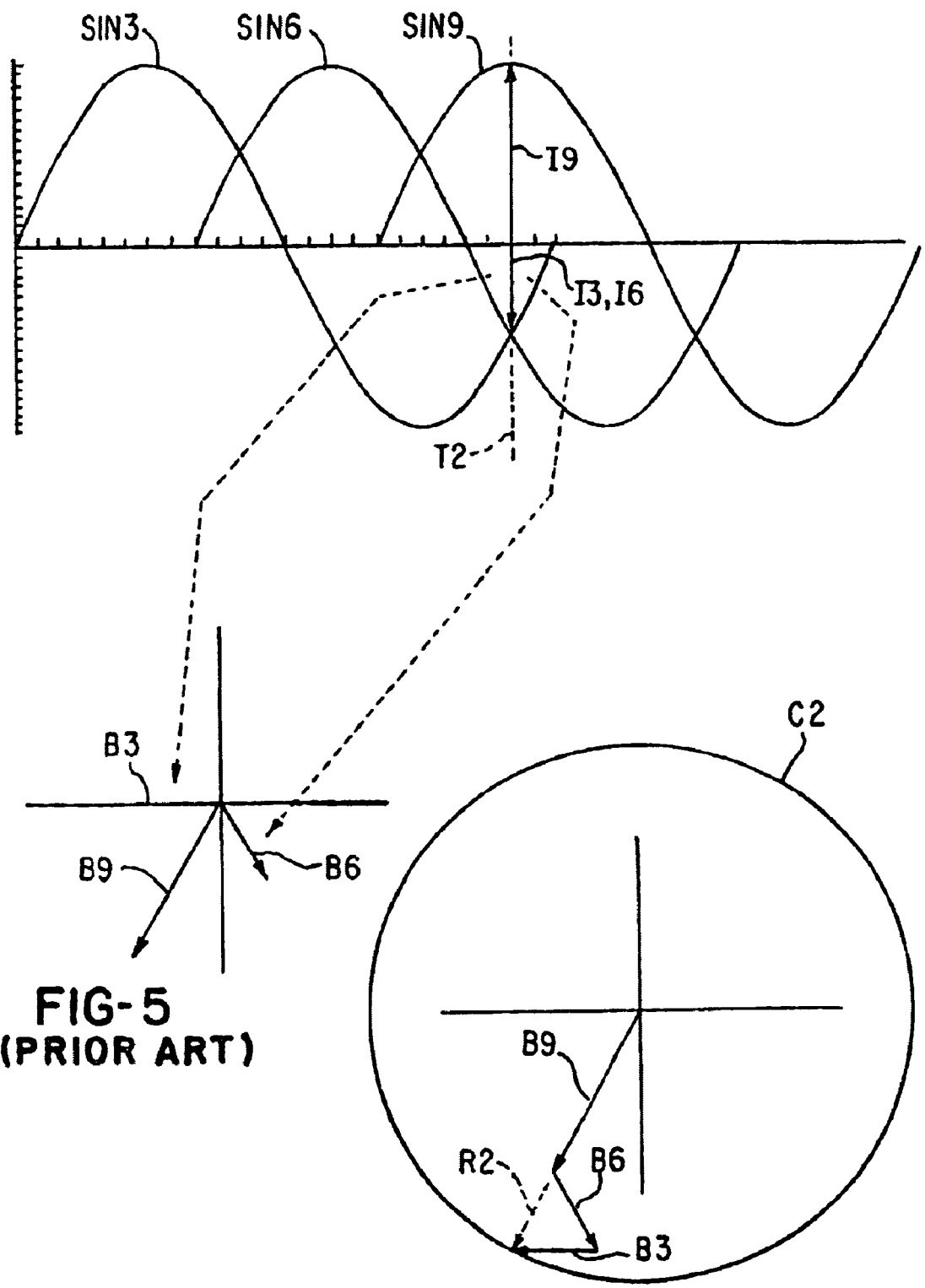
Figure 7:
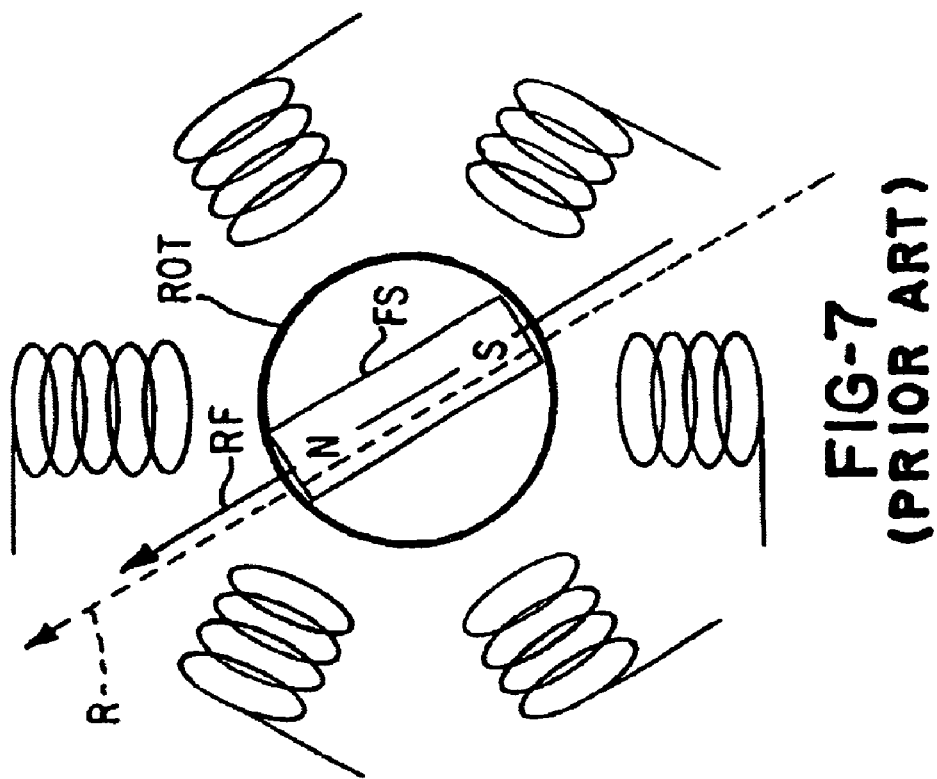
Figure 6:
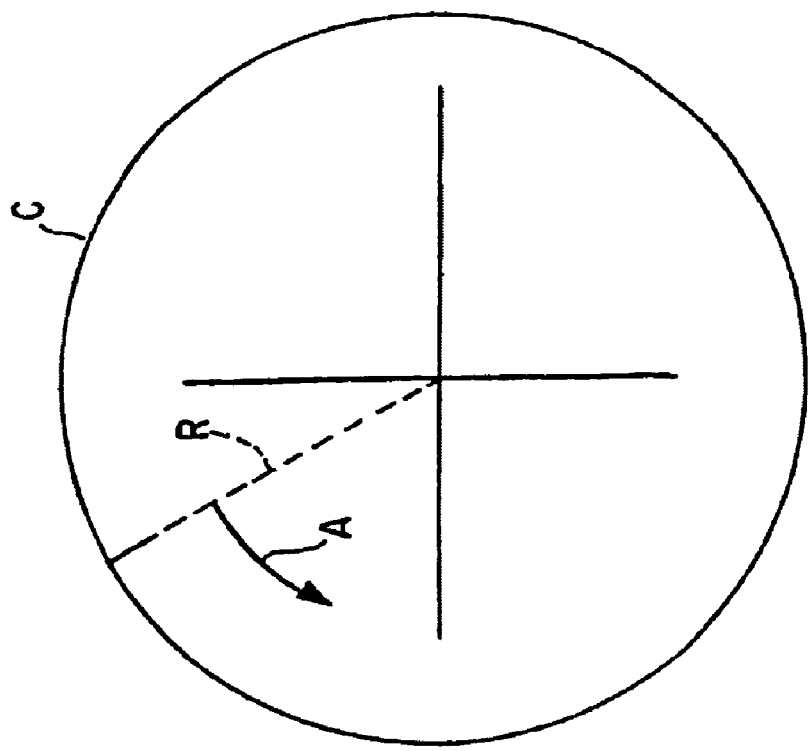

One or more of the Inventors, or their designees, wrote computer code for FOC of a three-phase system of the type shown in FIG. 2. The code ran on a 16-bit Digital Signal Processor, DSP, running at a given clock speed. This processor is of the type which executes one program instruction per clock cycle.

When compiled, the code occupied about N lines, or N instructions.

Functionally equivalent code was written for FOC for the 2-phase system of FIGS. 15 et seq., for the same DSP at the same clock speed. The code, when compiled, occupied about 0.69 N lines, or 0.69 N instructions. The reduction was about 30 percent. A reduction greater than 25 percent is accurately descriptive.

6. One characterization of the invention can be based on the preceding point 5. In a system wherein energy from a vehicle battery is converted into mechanical power in a power steering system, a three-phase FOC requires a program, running on a controller, and containing N instructions. For the same energy conversion context, the invention, by substituting a 2-phase motor and associated FOC, reduces the number of instructions to 0.69N.

7. Some comparisons of the 3-phase system, compared with the 2-phase system, will be given. For a given DSP, the latter requires a program containing 30 percent fewer instructions. As explained in the co-pending application, the 3-phase system requires two transistors per coil, or six transistors total. In the invention, four transistors per coil are required, for a total of eight transistors for two coils.

In the 3-phase case, three wires enter the motor, the neutral being contained within the motor. Under the invention, four wires enter the motor.

In the 3-phase case, a relay is required, as explained in the co-pending application. The invention eliminates the relay.

In the 3-phase case, maximum line voltage is not delivered to each coil. Under the invention, maximum line voltage is available to each coil. Also, in the two-phase case, the peak current is radical 3-over-2, or 0.866, of the peak current in the three-phase case. This reduction in peak current reduces Joule heating losses in the switching transistors, and other resistive elements in the power converter. Further, the lower current allows the use of switching transistors of lower current rating, which are less expensive.

As explained above, the invention generates a sine wave for each coil in the two-phase motor. One advantage of the invention is that the duty cycle needed for the PWM can be computed directly from the sine and cosine of rotor angle, as opposed to the three-phase case which requires a much more cumbersome process. For example, if the rotor angle is 45 degrees, and the controller specifies a phase angle of Beta, then the duty cycle for one coil will be sine(45+Beta) and the duty cycle for the other coil will be cosine(45+Beta) at that instant.

Numerous substitutions and modifications can be undertaken without departing from the true spirit and scope of the invention. What is desired to be secured by Letters Patent is the invention as defined in the following claims.

The invention claimed is:

1. A system (1) being powered by a battery which delivers a voltage V, and (2) effective for operation in a vehicle, comprising:
   a) a two-phase electric motor having
      i) a stator of the synchronous type and
      ii) two stator phases;
   b) a field-oriented controller for controlling voltages applied to the phases, wherein
      i) full battery voltage is available for application across each phase;
      ii) all phase voltages are independently controllable; and
      iii) a continually rotating stator vector is generated, of selected phase with respect to the rotor and of selected magnitude.

2. System according to claim 1, wherein pulse-width modulation, PWM, is used to control magnitude of current in each phase, and the PWM applied to one phase is not simultaneous with the PWM applied to the other phase.

3. System according to claim 1, wherein pulse-width modulation, PWM, is used to control magnitude of current in each phase, and the PWM applied to one phase need not be simultaneous with the PWM applied to the other phase.

4. System according to claim 1, wherein maximum current generated in each phase is not limited by a voltage less than V.

5. System according to claim 1, wherein the vehicle includes a power steering system, and the motor powers the power steering system.

6. A method for operation in a vehicle being powered by a battery which delivers a voltage V, comprising:
   a) maintaining a two-phase electric motor having
      i) a stator of the synchronous type and
      ii) two stator phases;
   b) maintaining a field-oriented controller for controlling voltages applied to the phases, which maintains a continually rotating stator field which is (1) of selected magnitude and (2) in selected phase relation with a rotor field, which
      i) applies full battery voltage across each phase; and
      ii) provides independently controllable voltages to all phases.

7. Method according to claim 6, wherein pulse-width modulation, PWM, is used to control magnitude of current in each phase, and the PWM applied to one phase is not simultaneous with the PWM applied to the other phase.

8. Method according to claim 6, wherein pulse-width modulation, PWM, is used to control magnitude of current in each phase, and the PWM applied to one phase need not be simultaneous with the PWM applied to the other phase.

9. Method according to claim 6, wherein maximum current generated in each phase is not limited by a voltage less than V.

10. Method according to claim 6, wherein the vehicle includes a power steering system, and the motor powers the power steering system.

11. Method according to claim 6, wherein two different duty cycles needed for synthesis of two sinusoids, one for each coil, are computed based on voltage magnitude and rotor angle.

12. A system (1) for operation in a vehicle having a power steering system, and (2) being powered by a battery which delivers a voltage V, comprising:
   a) a two-phase electric motor having
      i) a stator of the synchronous type and
      ii) two stator phases;
   b) a field-oriented controller for controlling voltages applied to the phases, which maintains a continually rotating stator field which is (1) of selected magnitude and (2) in selected phase relation with a rotor field, wherein
      i) full battery voltage is available for application across each phase; and
      ii) all phase voltages are independently controllable, wherein pulse-width modulation, PWM, is used to control magnitude of current in each phase, the PWM applied to one phase need not be synchronized with the PWM applied to the other phase, and voltage V is available for application to each phase.

13. A method (1) for operation in a vehicle having a power steering system, and (2) being powered by a battery which delivers a voltage V, comprising:
- a) providing a two-phase electric motor having
  - i) a stator of the synchronous type and
  - ii) two stator phases;
- b) providing a field-oriented controller for controlling voltages applied to the phases, which maintains a continually rotating stator field which is (1) of selected magnitude and (2) in selected phase relation with a rotor field, wherein
  - i) full battery voltage is available for application across each phase; and
  - ii) all phase voltages are independently controllable, wherein pulse-width modulation, PWM, is used to control magnitude of current in each phase, the PWM applied to one phase need not be synchronized with the PWM applied to the other phase, and voltage V is available for application to each phase.

14. In an electric motor which has a rotor having a rotor field and stator coils which produce a rotating stator field vector, and which is controlled by a control system implementing Field Oriented Control, which maintains a continually rotating stator field which is (1) of selected magnitude and (2) in selected phase relation with the rotor field, a method comprising:
- a) deriving data concerning behavior of the coils; and
- b) based on the data, computing position of the stator field vector, without translating from an N-phase reference frame of the stator to an orthogonal reference frame, wherein N is greater than two.

15. Method according to claim 14, and further comprising:
- c) computing a demanded stator field vector in the rotating coordinate system; and
- d) computing currents required in the coils to produce the demanded stator field vector, without translating into an N-phase reference frame, wherein N is greater than two.

16. Method according to claim 14, wherein N equals three.

17. Method according to claim 15, wherein N equals three.

18. For an electric motor which has a rotor having a rotor field and stator coils which produce a continually rotating stator field vector, and which is controlled by a control system implementing Field Oriented Control, which maintains the stator field (1) at a selected magnitude and (2) in a selected phase relation with the rotor field, a system comprising:
- a) means for deriving data concerning behavior of the coils; and
- b) means for receiving the data and computing position of the stator field vector, without translating from an N-phase reference frame of the stator to an orthogonal reference frame, wherein N is greater than two.

19. System according to claim 13, and further comprising:
- c) means for computing a demanded stator field vector in the rotating coordinate system; and
- d) means for computing currents required in the coils to produce the demanded stator field vector, without translating into an N-phase reference frame, wherein N is greater than two.

20. System according to claim 18, wherein N equals three.

21. System according to claim 19, wherein N equals three.

22. System according to claim 18, wherein all means comprise electronic circuitry, computer programs, or both.

23. System according to claim 19, wherein all means comprise electronic circuitry, computer programs, or both.

24. A system comprising:
- a) a motor comprising a two-phase stator of the synchronous type; and
- b) a control system which implements Field Oriented Control, which maintains a continually rotating stator field which is (1) of selected magnitude and (2) in selected phase relation with the rotor field, wherein the only coordinate transformations undertaken are (1) from a stationary system to a rotating system and (2) from the rotating system to the stationary system.

25. System according to claim 24, and further comprising:
- c) a motor vehicle which includes a power steering system, wherein the motor provides mechanical power to the power steering system.

26. A method comprising:
- a) providing a motor comprising a two-phase stator of the synchronous type; and
- b) providing a control system which implements Field Oriented Control, which maintains a continually rotating stator field which is (1) of selected magnitude and (2) in selected phase relation with the rotor field, wherein the only coordinate transformations undertaken are (1) from a stationary system to a rotating system and (2) from the rotating system to the stationary system.

27. Method according to claim 26, and further comprising:
- c) providing a motor vehicle which includes a power steering system, wherein the motor provides mechanical power to the power steering system.

28. A method, comprising:
- a) in a vehicle, maintaining an electric motor having a stator of the synchronous type;
- b) generating currents in coils of the stator, said currents producing a rotating stator field vector; and
- c) obtaining an expression for orthogonal components of the stator field, without computing said components.

29. Method according to claim 28, and further comprising:
- c) computing coordinates of the orthogonal components in a rotating coordinate system.

30. A system, comprising:
- a) a vehicle;
- b) a power source—power receiver pair comprising
  - i) an electrical power source in the vehicle, and
  - ii) a mechanical device to be powered, the power source-power receiver having the characteristic that, when a 3-phase electric motor and Field Oriented Control implemented in a DSP are used to convert power from the source to the receiver, a computer program having N lines of code is required, and
- c) means for converting power from the source to the receiver which requires 0.75 N, or fewer, lines of code.

31. System according to claim 30, wherein the means comprises a 2-phase motor having a stator of the synchronous type.

32. Apparatus according to claim 1, wherein two different duty cycles needed for synthesis of two sinusoids, one for each coil, are computed based on rotor angle and voltage magnitude.

33. A system (1) being powered by a battery which delivers a voltage V, and (2) for operation in a vehicle, comprising:
   a) a two-phase electric motor having
      i) a stator of the synchronous type and
      ii) two stator phases:
   b) a field-oriented controller for controlling voltages applied to the phases, wherein
      i) full battery voltage is available for application across each phase;
      ii) all phase voltages are independently controllable;
      iii) wherein
         A) two duty cycles needed for synthesis of two sinusoids, one for each coil, are computed based on rotor angle and voltage magnitude; and
         B) one duty cycle is computed as product of voltage magnitude and sine(rotor angle plus phase term) and the other duty cycle is computed as product of voltage magnitude and cosine(rotor angle plus the phase term).

34. A method for operation in a vehicle being powered by a battery which delivers a voltage V, comprising:
   a) maintaining a two-phase electric motor having
      i) a stator of the synchronous type and
      ii) two stator phases;
   b) maintaining a field-oriented controller for controlling voltages applied to the phases, which
      i) applies full battery voltage across each phase; and
      ii) provides independently controllable voltages to all phases wherein (A) two duty cycles needed for synthesis of two sinusoids, one for each coil, are computed based on voltage magnitude and rotor angle
   and (B) one duty cycle is computed as product of voltage magnitude and sine(rotor angle plus phase term) and the other duty cycle is computed as product of voltage magnitude and cosine(rotor angle plus the phase term).

\* \* \* \* \*